(12) United States Patent
Chastain et al.

(10) Patent No.: US 10,778,670 B2
(45) Date of Patent: *Sep. 15, 2020

(54) APPARATUS AND METHOD FOR SECURE AUTHENTICATION OF A COMMUNICATION DEVICE

(71) Applicant: AT&T Intellectual Property I, L.P., Atlanta, GA (US)

(72) Inventors: Walter Cooper Chastain, Atlanta, GA (US); Stephen Emille Chin, Marietta, GA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/122,038

(22) Filed: Sep. 5, 2018

(65) Prior Publication Data

US 2019/0007388 A1   Jan. 3, 2019

Related U.S. Application Data

(63) Continuation of application No. 14/929,501, filed on Nov. 2, 2015, now Pat. No. 10,104,062, which is a
(Continued)

(51) Int. Cl.
*H04L 29/06* (2006.01)
*G06F 21/31* (2013.01)
(Continued)

(52) U.S. Cl.
CPC ............ *H04L 63/083* (2013.01); *G06F 21/31* (2013.01); *G06F 21/32* (2013.01); *G06F 21/45* (2013.01);
(Continued)

(58) Field of Classification Search
CPC ............... H04L 63/083; H04L 63/0869; H04L 63/0861; G06F 21/31; G06F 21/32; G06F 21/45
(Continued)

(56) References Cited

U.S. PATENT DOCUMENTS 5,530,757 A   6/1996   Krawczyk
5,742,910 A   4/1998   Gallant et al.
(Continued)

FOREIGN PATENT DOCUMENTS

AU   2010315111 A1   6/2012
CA      2535102 C     5/2011
(Continued)

OTHER PUBLICATIONS

"Mobile/NFC Security Fundamentals Secure Elements 101" Smart Card Alliance Webinar Mar. 28, 2013.
(Continued)

*Primary Examiner* — Shahriar Zarrineh
(74) *Attorney, Agent, or Firm* — Guntin & Gust, PLC; Robert Gingher

(57) ABSTRACT

A system that incorporates the subject disclosure may perform, for example, receiving a baseline credential and an external credential, mapping the external credential to the baseline credential in a secure element memory, receiving a request for an authentication from a secure device processor of the communication device where the request for the authentication includes a user credential inputted into the communication device, comparing the user credential with the baseline credential to verify the authentication, and providing the authentication and the external credential to the secure device processor without providing the baseline credential to enable the secure device processor to provide the external credential to an external entity device that is
(Continued)

remote from the communication device. Other embodiments are disclosed.

20 Claims, 11 Drawing Sheets

Related U.S. Application Data continuation of application No. 14/061,380, filed on Oct. 23, 2013, now Pat. No. 9,208,300.

(51) Int. Cl.
G06F 21/32 (2013.01)
G06F 21/45 (2013.01)

(52) U.S. Cl.
CPC ...... *H04L 63/0853* (2013.01); *H04L 63/0861* (2013.01); *H04L 63/0869* (2013.01)

(58) Field of Classification Search
USPC .......................................................... 726/6
See application file for complete search history.

(56) References Cited

U.S. PATENT DOCUMENTS

| | | | |
|---|---|---|---|
| 5,774,544 A | 6/1998 | Lee et al. |
| 6,005,942 A | 12/1999 | Chan et al. |
| 6,014,561 A | 1/2000 | Moelne |
| 6,151,677 A | 11/2000 | Walter et al. |
| 6,615,038 B1 | 9/2003 | Moles |
| 6,850,252 B1 | 2/2005 | Hoffberg |
| 6,892,301 B1 | 5/2005 | Hansmann et al. |
| 6,922,200 B1 | 7/2005 | Marques et al. |
| 7,165,173 B1 | 1/2007 | Herle |
| 7,171,460 B2 | 1/2007 | Kalavade et al. |
| 7,185,362 B2 | 2/2007 | Hawkes et al. |
| 7,239,704 B1 | 7/2007 | Maillard et al. |
| 7,257,844 B2 | 8/2007 | Woodward et al. |
| 7,269,732 B2 | 9/2007 | Kilian-Kehr |
| 7,346,586 B1 | 3/2008 | Walmsley et al. |
| 7,382,881 B2 | 6/2008 | Uusitalo et al. |
| 7,454,233 B2 | 11/2008 | Lu et al. |
| 7,472,123 B2 | 12/2008 | Hamatsu |
| 7,480,907 B1 | 1/2009 | Marolia et al. |
| 7,486,810 B1 | 2/2009 | Accapadi et al. |
| 7,499,960 B2 | 3/2009 | Dageville et al. |
| 7,606,560 B2 | 10/2009 | Labrou et al. |
| 7,668,315 B2 | 2/2010 | Quick, Jr. et al. |
| 7,715,823 B2 | 5/2010 | Bravo et al. |
| 7,751,567 B2 | 7/2010 | Quick, Jr. et al. |
| 7,882,208 B2 | 2/2011 | Akashika et al. |
| 7,917,751 B2 | 3/2011 | Keohane et al. |
| 7,933,591 B2 | 4/2011 | Blom et al. |
| 7,953,391 B2 | 5/2011 | Lee et al. |
| 8,027,472 B2 | 9/2011 | Aissi et al. |
| 8,032,756 B2 | 10/2011 | Inami |
| 8,037,522 B2 | 10/2011 | Holtmanns et al. |
| 8,055,910 B2 | 11/2011 | Kocher et al. |
| 8,064,598 B2 | 11/2011 | Vaha-Sipila et al. |
| 8,098,818 B2 | 1/2012 | Grilli et al. |
| 8,165,635 B2 | 4/2012 | Khan et al. |
| 8,166,524 B2 | 4/2012 | Sentinelli |
| 8,186,591 B2 | 5/2012 | Jolivet |
| 8,213,612 B2 | 7/2012 | Kaabouch et al. |
| 8,244,181 B2 | 8/2012 | Shuo |
| 8,260,259 B2 | 9/2012 | Semple et al. |
| 8,271,025 B2 | 9/2012 | Brisebois et al. |
| 8,284,025 B2 * | 10/2012 | Beenau ................ H04W 12/06 340/5.84 |
| 8,286,002 B2 * | 10/2012 | Kamat ................ H04L 63/0281 713/192 |
| 8,307,410 B2 | 11/2012 | Martin et al. |
| 8,333,321 B2 | 12/2012 | Gressel et al. |
| 8,335,921 B2 | 12/2012 | von Behren et al. |
| 8,346,287 B2 | 1/2013 | King et al. |
| 8,346,672 B1 * | 1/2013 | Weiner ................ H04W 12/06 705/75 |
| 8,380,171 B2 | 2/2013 | Link et al. |
| 8,387,119 B2 | 2/2013 | Patel et al. |
| 8,391,837 B2 | 3/2013 | Corda |
| 8,406,758 B2 | 3/2013 | Snijder et al. |
| 8,417,952 B2 | 4/2013 | Cheng et al. |
| 8,429,708 B1 | 4/2013 | Tandon |
| 8,452,012 B2 | 5/2013 | Aissi et al. |
| 8,483,261 B2 | 7/2013 | Seo et al. |
| 8,494,908 B2 | 7/2013 | Herwig et al. |
| 8,495,213 B2 | 7/2013 | Deprun et al. |
| 8,503,376 B2 | 8/2013 | Cha et al. |
| 8,505,085 B2 | 8/2013 | Logan et al. |
| 8,510,553 B2 | 8/2013 | Adrangi et al. |
| 8,510,559 B2 | 8/2013 | Guccione et al. |
| 8,533,803 B2 | 9/2013 | Cha et al. |
| 8,543,814 B2 | 9/2013 | Laitinen et al. |
| 8,554,222 B2 | 10/2013 | Yang et al. |
| 8,559,633 B2 | 10/2013 | Cao et al. |
| 8,604,906 B1 * | 12/2013 | Halferty ................ G05B 1/01 340/5.83 |
| 8,606,319 B2 | 12/2013 | Ali et al. |
| 8,625,800 B2 | 1/2014 | Jooste et al. |
| 8,738,898 B2 | 5/2014 | Herwono et al. |
| 8,756,427 B2 | 6/2014 | Shah et al. |
| 8,776,189 B2 | 7/2014 | Jain |
| 8,799,451 B2 | 8/2014 | Raleigh et al. |
| 8,799,932 B2 | 8/2014 | Prevost et al. |
| 8,814,051 B2 | 8/2014 | Millet et al. |
| 8,837,449 B2 | 9/2014 | Chen et al. |
| 9,106,628 B2 | 8/2015 | Kolesnikov et al. |
| 9,130,972 B2 | 9/2015 | Barkan et al. |
| 9,185,089 B2 | 11/2015 | Khan et al. |
| 9,301,145 B2 | 3/2016 | Merrien et al. |
| 9,442,833 B1 | 9/2016 | Johansson et al. |
| 9,521,126 B2 | 12/2016 | Boelter et al. |
| 9,668,128 B2 | 5/2017 | Palanigounder et al. |
| 9,767,474 B1 * | 9/2017 | Ramalingam .... G06Q 20/35785 |
| 2001/0029581 A1 | 10/2001 | Knauft et al. |
| 2002/0003892 A1 | 1/2002 | Iwanaga et al. |
| 2002/0040936 A1 | 4/2002 | Wentker et al. |
| 2002/0174071 A1 | 11/2002 | Boudou et al. |
| 2002/0188855 A1 | 12/2002 | Nakayama et al. |
| 2003/0129965 A1 | 7/2003 | Siegel |
| 2003/0186722 A1 | 10/2003 | Weiner |
| 2004/0240671 A1 | 12/2004 | Hu et al. |
| 2005/0002407 A1 | 1/2005 | Shaheen et al. |
| 2005/0083947 A1 | 4/2005 | Vaarala et al. |
| 2005/0120248 A1 | 6/2005 | Medvinsky et al. |
| 2005/0138394 A1 * | 6/2005 | Poinsenet ................ G06F 21/32 713/186 |
| 2005/0202803 A1 | 9/2005 | Mahalal |
| 2005/0259673 A1 | 11/2005 | Lu et al. |
| 2005/0278787 A1 | 12/2005 | Naslund et al. |
| 2006/0053296 A1 * | 3/2006 | Busboom ............... H04L 63/083 713/182 |
| 2006/0074550 A1 | 4/2006 | Freer et al. |
| 2006/0079284 A1 | 4/2006 | Lu et al. |
| 2006/0080525 A1 * | 4/2006 | Ritter ................ G06F 21/32 713/155 |
| 2006/0085848 A1 | 4/2006 | Aissi et al. |
| 2006/0101270 A1 | 5/2006 | Laitinen |
| 2006/0130128 A1 | 6/2006 | Gorancic et al. |
| 2006/0165060 A1 | 7/2006 | Dua |
| 2006/0205387 A1 | 9/2006 | Laitinen et al. |
| 2006/0206710 A1 | 9/2006 | Gehrmann |
| 2006/0242064 A1 | 10/2006 | Jogand-Coulomb et al. |
| 2006/0269061 A1 | 11/2006 | Balasubramanian et al. |
| 2006/0289659 A1 | 12/2006 | Mizushima et al. |
| 2007/0050365 A1 | 3/2007 | Laitinen et al. |
| 2007/0092114 A1 * | 4/2007 | Ritter ................ G06K 9/00979 382/115 |
| 2007/0101122 A1 | 5/2007 | Guo |
| 2007/0180263 A1 * | 8/2007 | Delgrosso ........ G06Q 20/40145 713/186 |
| 2007/0239857 A1 | 10/2007 | Mahalal et al. |
| 2007/0294744 A1 | 12/2007 | Alessio et al. |

(56) References Cited

U.S. PATENT DOCUMENTS

| | | |
|---|---|---|
| 2007/0299780 A1 | 12/2007 | Vanska et al. |
| 2008/0005559 A1 | 1/2008 | Johnson |
| 2008/0010470 A1 | 1/2008 | McKeon et al. |
| 2008/0016230 A1* | 1/2008 | Holtmanns ............ H04L 63/08 709/229 |
| 2008/0059804 A1 | 3/2008 | Shah et al. |
| 2008/0065777 A1 | 3/2008 | Sherkin et al. |
| 2008/0080399 A1 | 4/2008 | Wang et al. |
| 2008/0107058 A1 | 5/2008 | Yang et al. |
| 2008/0127345 A1 | 5/2008 | Holtmanns et al. |
| 2008/0155257 A1 | 6/2008 | Werner et al. |
| 2008/0194296 A1 | 8/2008 | Roundtree et al. |
| 2008/0276090 A1 | 11/2008 | Merrien et al. |
| 2008/0294891 A1 | 11/2008 | Ram Ov et al. |
| 2008/0301433 A1 | 12/2008 | Vito |
| 2008/0304458 A1 | 12/2008 | Aghvami et al. |
| 2009/0077643 A1 | 3/2009 | Schmidt et al. |
| 2009/0116642 A1 | 5/2009 | Yang |
| 2009/0119506 A1 | 5/2009 | Allen et al. |
| 2009/0163235 A1 | 6/2009 | Michaels et al. |
| 2009/0191846 A1 | 7/2009 | Shi |
| 2009/0191857 A1 | 7/2009 | Horn et al. |
| 2009/0193151 A1* | 7/2009 | Adams .................... G06F 21/32 710/5 |
| 2009/0220091 A1 | 9/2009 | Howard |
| 2009/0287922 A1 | 11/2009 | Herwono et al. |
| 2009/0288012 A1 | 11/2009 | Hertel et al. |
| 2009/0291712 A1 | 11/2009 | Park et al. |
| 2009/0313472 A1 | 12/2009 | Guccione et al. |
| 2009/0327138 A1 | 12/2009 | Mardani et al. |
| 2010/0037230 A1 | 2/2010 | Potonniee et al. |
| 2010/0048169 A1 | 2/2010 | Yan et al. |
| 2010/0062808 A1 | 3/2010 | Cha et al. |
| 2010/0159878 A1 | 6/2010 | Kim et al. |
| 2010/0185874 A1 | 7/2010 | Robles et al. |
| 2010/0197350 A1 | 8/2010 | Jeung |
| 2010/0235906 A1* | 9/2010 | Berry .................... G06F 21/34 726/20 |
| 2010/0255819 A1 | 10/2010 | Robles et al. |
| 2010/0281251 A1 | 11/2010 | Arauz Rosado |
| 2010/0287375 A1 | 11/2010 | Lee et al. |
| 2010/0299731 A1 | 11/2010 | Atkinson |
| 2010/0306531 A1 | 12/2010 | Nahari |
| 2010/0315346 A1 | 12/2010 | Lindroos et al. |
| 2010/0317320 A1* | 12/2010 | Sakargayan ............ H04L 63/08 455/410 |
| 2010/0332400 A1* | 12/2010 | Etchegoyen ............ G06F 21/32 705/75 |
| 2011/0003580 A1 | 1/2011 | Belrose et al. |
| 2011/0007899 A1 | 1/2011 | Park et al. |
| 2011/0029779 A1 | 2/2011 | Sekiya et al. |
| 2011/0035584 A1 | 2/2011 | Meyerstein et al. |
| 2011/0087610 A1 | 4/2011 | Batada et al. |
| 2011/0093913 A1 | 4/2011 | Wohlert et al. |
| 2011/0158090 A1 | 6/2011 | Riley et al. |
| 2011/0191597 A1 | 8/2011 | Grall et al. |
| 2011/0208600 A1 | 8/2011 | Aharoni et al. |
| 2011/0211699 A1 | 9/2011 | Ma et al. |
| 2011/0265159 A1 | 10/2011 | Ronda et al. |
| 2011/0269423 A1 | 11/2011 | Schell et al. |
| 2011/0275364 A1 | 11/2011 | Austin et al. |
| 2011/0296182 A1 | 12/2011 | Jia et al. |
| 2011/0296494 A1 | 12/2011 | Muller et al. |
| 2011/0302017 A1 | 12/2011 | Marti et al. |
| 2011/0302408 A1 | 12/2011 | McDermott et al. |
| 2011/0306318 A1 | 12/2011 | Rodgers et al. |
| 2012/0027209 A1 | 2/2012 | Aissi et al. |
| 2012/0028609 A1 | 2/2012 | Hruska |
| 2012/0036042 A1 | 2/2012 | Graylin et al. |
| 2012/0047237 A1 | 2/2012 | Arvidsson et al. |
| 2012/0047563 A1 | 2/2012 | Wheeler et al. |
| 2012/0066504 A1 | 3/2012 | Hird et al. |
| 2012/0072979 A1 | 3/2012 | Cha et al. |
| 2012/0096513 A1 | 4/2012 | Raleigh et al. |
| 2012/0102557 A1 | 4/2012 | Felton et al. |
| 2012/0108205 A1 | 5/2012 | Schell et al. |
| 2012/0108213 A1 | 5/2012 | Kasargod et al. |
| 2012/0130838 A1 | 5/2012 | Koh et al. |
| 2012/0142332 A1 | 6/2012 | Li |
| 2012/0144201 A1 | 6/2012 | Anantha et al. |
| 2012/0159105 A1 | 6/2012 | von Behren et al. |
| 2012/0159163 A1 | 6/2012 | von Behren et al. |
| 2012/0159602 A1 | 6/2012 | Haynes |
| 2012/0171992 A1 | 7/2012 | Cheong et al. |
| 2012/0172016 A1 | 7/2012 | Veneroso et al. |
| 2012/0172089 A1 | 7/2012 | Bae et al. |
| 2012/0185661 A1 | 7/2012 | Desai et al. |
| 2012/0187184 A1 | 7/2012 | Challa et al. |
| 2012/0190354 A1 | 7/2012 | Merrien et al. |
| 2012/0208597 A1 | 8/2012 | Billman |
| 2012/0226582 A1 | 9/2012 | Hammad |
| 2012/0231844 A1 | 9/2012 | Coppinger et al. |
| 2012/0233685 A1 | 9/2012 | Palanigounder et al. |
| 2012/0246476 A1 | 9/2012 | Zhuang et al. |
| 2012/0259849 A1 | 10/2012 | Deodhar et al. |
| 2012/0260095 A1* | 10/2012 | Von Hauck ............ H04L 63/061 713/176 |
| 2012/0266220 A1 | 10/2012 | Brudnicki et al. |
| 2012/0284785 A1* | 11/2012 | Salkintzis ............... G06F 21/43 726/7 |
| 2012/0311563 A1 | 12/2012 | Lee et al. |
| 2012/0317261 A1 | 12/2012 | Ahmavaara et al. |
| 2012/0331292 A1 | 12/2012 | Haggerty et al. |
| 2013/0012168 A1 | 1/2013 | Rajadurai et al. |
| 2013/0023235 A1 | 1/2013 | Fan et al. |
| 2013/0024383 A1 | 1/2013 | Kannappan et al. |
| 2013/0041830 A1 | 2/2013 | Singh et al. |
| 2013/0061303 A1* | 3/2013 | Hart ...................... G06F 21/33 726/6 |
| 2013/0067232 A1 | 3/2013 | Cheung et al. |
| 2013/0067552 A1 | 3/2013 | Hawkes et al. |
| 2013/0074163 A1 | 3/2013 | Murakami et al. |
| 2013/0111546 A1 | 5/2013 | Gargiulo et al. |
| 2013/0117824 A1 | 5/2013 | Naslund et al. |
| 2013/0133052 A1* | 5/2013 | Davis .................... G06F 21/316 726/7 |
| 2013/0139230 A1 | 5/2013 | Koh et al. |
| 2013/0145455 A1 | 6/2013 | Vijayshankar et al. |
| 2013/0152208 A1 | 6/2013 | King et al. |
| 2013/0166595 A1 | 6/2013 | Meketa et al. |
| 2013/0173759 A1* | 7/2013 | Herse .................... G06F 21/34 709/219 |
| 2013/0203465 A1 | 8/2013 | Ali et al. |
| 2013/0212660 A1 | 8/2013 | Neafsey et al. |
| 2013/0223623 A1 | 8/2013 | Jooste et al. |
| 2013/0262317 A1 | 10/2013 | Collinge et al. |
| 2013/0272714 A1 | 10/2013 | Ohkubo |
| 2013/0273889 A1 | 10/2013 | Lobmaier |
| 2013/0291071 A1 | 10/2013 | Blom et al. |
| 2013/0291084 A1 | 10/2013 | Amiel et al. |
| 2013/0305330 A1 | 11/2013 | Palanigounder |
| 2013/0326614 A1* | 12/2013 | Truskovsky .......... H04L 9/3213 726/19 |
| 2013/0329683 A1 | 12/2013 | Gachon et al. |
| 2013/0333015 A1 | 12/2013 | Reynolds et al. |
| 2013/0344857 A1 | 12/2013 | Berionne et al. |
| 2014/0013406 A1 | 1/2014 | Tremlet et al. |
| 2014/0018041 A1 | 1/2014 | Summerer et al. |
| 2014/0040633 A1 | 2/2014 | Leleu |
| 2014/0045462 A1 | 2/2014 | Warnez |
| 2014/0057680 A1 | 2/2014 | Proust et al. |
| 2014/0059671 A1* | 2/2014 | Celi, Jr. .............. G06F 21/6236 726/18 |
| 2014/0066019 A1 | 3/2014 | Waters et al. |
| 2014/0073375 A1* | 3/2014 | Li ........................ H04L 63/083 455/558 |
| 2014/0101449 A1 | 4/2014 | Trujillo Gonzalez et al. |
| 2014/0108799 A1* | 4/2014 | Wang .................... G06F 21/44 713/168 |
| 2014/0173721 A1* | 6/2014 | Shenfield ............ G06F 3/0488 726/21 |
| 2014/0189880 A1 | 7/2014 | Funk et al. |

(56) References Cited

U.S. PATENT DOCUMENTS

| | | |
|---|---|---|
| 2014/0215589 A1 | 7/2014 | Dietrich et al. |
| 2014/0243022 A1 | 8/2014 | L'Heriteau et al. |
| 2014/0281498 A1 | 9/2014 | Bransom et al. |
| 2014/0317686 A1 | 10/2014 | Vetillard et al. |
| 2014/0324698 A1 | 10/2014 | Dolcino et al. |
| 2014/0337234 A1 | 11/2014 | Brewer et al. |
| 2014/0373117 A1 | 12/2014 | Le Saint |
| 2014/0380056 A1 | 12/2014 | Buckley et al. |
| 2015/0017910 A1* | 1/2015 | Li .................. H04B 5/0031 455/41.1 |
| 2015/0106456 A1 | 4/2015 | van Hoek |
| 2015/0121510 A1* | 4/2015 | Gauteron .......... G06F 21/31 726/19 |
| 2015/0249658 A1 | 9/2015 | Lee et al. |
| 2015/0256537 A1* | 9/2015 | Chew .............. H04L 9/3263 726/7 |
| 2015/0286811 A1* | 10/2015 | Phan ............... G06F 21/32 726/7 |
| 2016/0006762 A1 | 1/2016 | Dumoulin et al. |
| 2016/0182512 A1 | 6/2016 | Chastain et al. |
| 2016/0323111 A1 | 11/2016 | Chastain et al. |
| 2016/0323255 A1 | 11/2016 | Chastain et al. |
| 2017/0118185 A1 | 4/2017 | Chastain et al. |
| 2017/0180366 A1 | 6/2017 | Chastain et al. |
| 2017/0295158 A1 | 10/2017 | Chastain |
| 2018/0054448 A1 | 2/2018 | Chastain et al. |
| 2018/0145980 A1 | 5/2018 | Chastain et al. |
| 2018/0191715 A1 | 7/2018 | Chastain et al. |
| 2018/0279117 A1 | 9/2018 | Chastain et al. |
| 2018/0367996 A1 | 12/2018 | Chastain et al. |
| 2019/0014129 A1 | 1/2019 | Chastain et al. |
| 2019/0141038 A1 | 5/2019 | Chastain et al. |
| 2019/0312885 A1 | 10/2019 | Chastain et al. |

FOREIGN PATENT DOCUMENTS

| | | |
|---|---|---|
| CA | 2823685 A1 | 2/2012 |
| EP | 1377091 B1 | 12/2005 |
| EP | 1257922 B1 | 6/2006 |
| EP | 1865437 A2 | 12/2007 |
| EP | 1480476 B1 | 10/2008 |
| EP | 2041913 A1 | 4/2009 |
| EP | 2074741 A1 | 7/2009 |
| EP | 2113856 A1 | 11/2009 |
| EP | 2210436 A1 | 7/2010 |
| EP | 2223252 A1 | 9/2010 |
| EP | 2461613 A1 | 6/2012 |
| EP | 2641206 A1 | 9/2013 |
| KR | 2013027097 | 3/2013 |
| WO | 2002063517 | 8/2002 |
| WO | 03046719 A2 | 6/2003 |
| WO | 2003046719 | 6/2003 |
| WO | 2007079636 | 7/2007 |
| WO | 2008059353 A1 | 5/2008 |
| WO | 2008149196 A1 | 12/2008 |
| WO | 2009046400 | 4/2009 |
| WO | 2009/126647 | 10/2009 |
| WO | 2010027765 A2 | 3/2010 |
| WO | 2010051715 | 5/2010 |
| WO | 2011115407 | 9/2011 |
| WO | 2012065829 A1 | 5/2012 |
| WO | 2012110880 A1 | 8/2012 |
| WO | 2012151571 A2 | 11/2012 |
| WO | 2013006116 A2 | 1/2013 |
| WO | 2013/036009 | 3/2013 |
| WO | 2013098117 A1 | 7/2013 |
| WO | 2013/050296 | 11/2013 |

OTHER PUBLICATIONS

"The Standard for Managing Applications on Secure Chip Technology," Interactive web site http://www.globalplatform.org/ Disclosing standards for GlobalPlatform chips—see tabs on "Specifications" and "Compliance", 1 pg., 2014.

"Over-The-Air Platform Security Review", Mandiant Intelligent Information Security, 6 pgs., Aug. 17, 2010.

"The OTA Platform in the World of LTE", 14 pgs., Jan. 2011.

"Reprogrammable SI Ms: Technology, Evolution and Implications Final Report", CSMG (Year: 2012), Sep. 25, 2012.

3rd Generation Partnership Project; Technical Specification Group Core Network and Terminals; Characteristics of the Universal Subscriber Identity Module (USIM) application, Release 11, 2012.

"3rd Generation Partnership Project; Technical Specification Group Core Network and Terminals; Remote APDU Structure for (U)SIM Toolkit applications", Release 10, 2012.

"3rd Generation Partnership Project; Technical Specification Group Core Network and Terminals; Secured packet structure for (Universal) Subscriber Identity Module (U)SIM Toolkit applications", Release 10, 2012.

"3rd Generation Partnership Project; Technical Specification Group Core Network and Terminals; UICC-terminal interface; Physical and logical characteristics", Release 10, 2011.

"3rd Generation Partnership Project; Technical Specification Group Core Network and Terminals; Universal Subscriber Identity Module (USIM) Application Toolkit (USAT)", Release 11, 2012.

"GlobalPlatform Card Confidential Card Content Management Card Specification v2.2—Amendment A", 2011.

"GlobalPlatform Card Contactless Services Card Specification v2.2—Amendment C", 2012.

"GlobalPlatform Card Remote Application Management over HTTP Card Specification v2.2—Amendment B", 2012.

"GlobalPlatform Card Security Upgrade for Card Content Management Card Specification v 2.2—Amendment E", 2011.

"GlobalPlatform Card Specification", Version 2.2.1, 2011.

"GlobalPlatform Card Technology Secure Channel Protocol 03 Card Specification v 2.2—Amendment D", 2009.

"GlobalPlatform Device Secure Element Remote Application Management", May 2011.

"GlobalPlatform Device Technology Secure Element Access Control", Version 1.0, May 2012.

"GlobalPlatform Device Technology TEE System Architecture", Dec. 2011.

"GlobalPlatform Key Management System", Functional Requirements, Nov. 2003.

"GlobalPlatform System Messaging Specification for Management of Mobile-NFC Services", Feb. 2011.

"Reprogrammable SIMs: Technology, Evolution and Implications", csmg, Sep. 25, 2012.

"Reprogrammable SIMs: Technology, Evolution and Implications Final Report", CSMG-Global, Sep. 25, 2012, 1-95.

"Secure Authentication for Mobile Internet Services", Sim Alliance, http://simalliance.org/wp-content/uploads/2015/03/12-01-01-WP_SIMallianceSecureAuthentication-EN-V1.1.pdf, Dec. 1-23, 2011.

"Smart Cards; Card Application Tookit (CAT)", Release 11, 2012.

"Smart Cards; ETSI numbering system for telecommunication application providers", Release 11, 2011.

"Smart Cards; Machine to Machine UICC; Physical and logical characteristics", Release 9, 2011.

"Smart Cards; Remote APDU structure for UICC based applications", Release 11, 2012.

"Smart Cards; Secure Channel Between a UICC and an End-Point Terminal (Release 7)", European Telecommunications Standards Institute, May 9, 2018, 5 pages.

"Smart Cards; Secured packet structure for UICC based applications", Release 11, 2012.

"Smart Cards; Security mechanisms for UICC based Applications Functional requirements", Release 8, 2008.

"Smart Cards; UICC Application Programming Interface (UICC API) for Java Card™", Release 9, 2012.

"Smart Cards; UICC-Terminal Interface; Physical and logical characteristics", Release 10, 2011, 179 pages.

"Universal Mobile Telecommunications System (UMTS); UICC-terminal interface; Physical and logical characteristics", Release 10, 2011.

Barriga, et al., "M2M Remote-Subscription Management," Ericsson Review, ericsson.com, 6 pgs, 2011.

(56) References Cited

OTHER PUBLICATIONS

Bernabeu, "Liberty ID-WSF Advanced Client Implementation and Deployment guidelines for SIM/UICC Card environment," Liberty Alliance Project Version 1.0, 18 pgs., 2009.

Chen, "An efficient end-to-end security mechanism for IP multimedia subsystem", Computer Communications, 2008, vol. 31.18, pp. 4259-4268.

Chun-Ze, "Study and implementation of UICC security features," Journal of Chongqing University of Posts and Telecommunications (Natural Science Edition) 1 pg., 2006.

Dodson, Ben et al., "Snap2Pass: Consumer—Friendly Challenge-Response Authentication with a Phone", http://prpl.stanford.edu/papers/soups10j.pdf, Apr. 30, 2010.

Edlund, Lasse, "Secure and confidential application on UICC" KTH Computer Science and Communication Master of Science Thesis Stockholm, Sweden, 44 pgs., 2009.

Ericsson, "The OTA Platform in the World of LTE". Giesecke & Devrient, Jan. 2011.

Farhat, Farshid et al., "Private Identification, Authentication and Key Agreement Protocol with Security Mode Setup", Iran Telecommunication Research Center, https://eprint.iacr.org/2011/045.pdf, Apr. 2011, 21 pages.

Global Platform, "Secure Element Remote Application Management", Version 1.0, May 2011.

Huang, et al., "IC activation and user authentication for security-sensitive systems", IEEE 10.1109/HST.2008.4559056, 2008.

Imhontu, et al., "A survey on near field communication in mobile phones & PDAs", Dissertation Halmstad University, 2010. http://hh.diva-portal.org/smash/get/diva2:385433/FULLTEXT01.

Kim, Jong-Min et al., "A Study of Coupons issuance System Considering of User Convenience Based on NFC", 3rd International Conference on Computer Science and Information Technology (ICCSIT'2013) Jan. 4-5, 2013 Bali (Indonesia). http://psrcentre.org/images/extraimages/113118.pdf.

Kounelis, Ioannis et al., "Secure Middleware for Mobile Phones and UICC Applications", Mobile Wireless Middleware, Operating Systems, and Applications, Springer Berlin Heidelberg, 2012, 143-152.

Kounelis, Ioannis et al., "Security of service requests for cloud based m-commerce", MIPRO, 2012 Proceedings of the 35th International Convention, IEEE, 2012.

Lamotte, Thierry, "IP Smart Cards in the (Not So) Distant Future," ETSI Project Smart Card Platform Meeting Gemplus Research Lab Paper, 18 pgs., Mar. 15, 2001.

Leicher, "An Identity Provider using a Secure Element of a Phone: Smart Card Based OpenID," 14 pgs., 2012.

Lunde, Lars et al., "Using SIM for strong end-to-end Application Authentication," NTNU Innovation and Creativity, Master of Science in Communication Technology, 170 pgs., May 2006.

Meyerstein, "Security Aspects of Smart Cards vs. Embedded Security in Machine-to-Machine (M2M) Advanced Mobile Network Applications," Security and Privacy in Mobile Information and Communication Systems Lecture Notes of the Institute for Computer Sciences, Social Info.

Meyerstein, et al., "Security Aspects of Smart Cards vs. Embedded Security in Machine-to-Machine (M2M) Advanced Mobile Network Applications", InterDigital Communications Corporation LLC, First International ICST Conference: MobiSec 2009, Security and Privacy in Mobile Information and Communication Systems, p. 214-225, Jun. 3-5, 2009.

Nagalakshmi, et al., "Modified Protocols for Internet Key Exchange (IKE) Using Public Encryption and Signature Keys", Information Technology: New Generations (ITNG), 2011 Eighth International Conference on, 2011, pp. 376, 381.

Nakarmi, Prajwol K. "Evaluation of VoIP Security for Mobile Devices," KTH Royal Institute of Technology, Master's Thesis, Stockholm, 82 pgs. Jun. 16, 2011.

Nelenkov, "Using the SIM card as a secure element in Android", http''//nelenkov.blogspot.com/2013/09/using-sim-card-as-secure-element.ntml, 11 pgs., 2013.

Sher, "Secure service provisioning (SSP) framework for IP multimedia subsystem (IMS)", Technical University of Berlin Doctoral thesis, 225 pgs., Dec. 14, 2007.

Siddiqi, "Smart Card Packaging Process Control System," KTH Royal Insitute of Technology School of Information and Communication Technology Stockholm, Sweden Masters Thesis, 102 pgs., Aug. 1, 2012.

Zhang, et al., "Cryptographic Key Agreement Protocol Simulation", Semantics Knowledge and Grid (SKG), 2010 Sixth International Conference on, 2010, pp. 418, 419.

\* cited by examiner

100

200

300

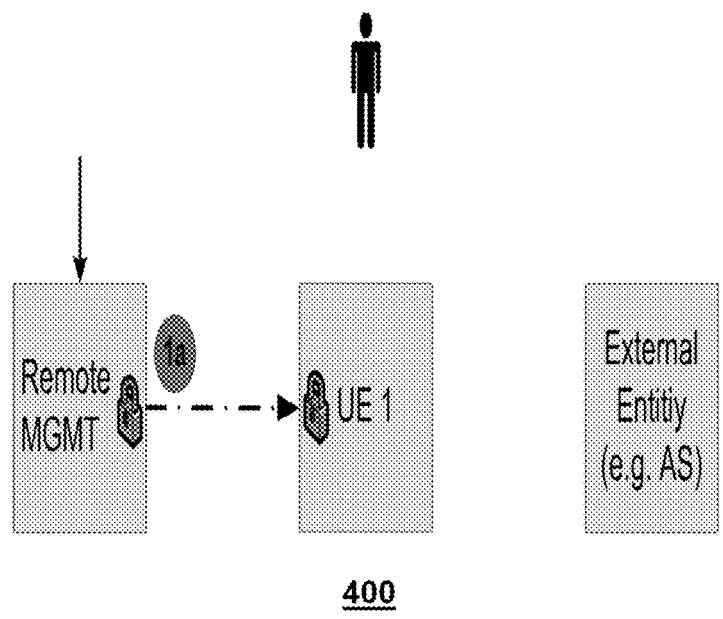
400
FIG. 4A
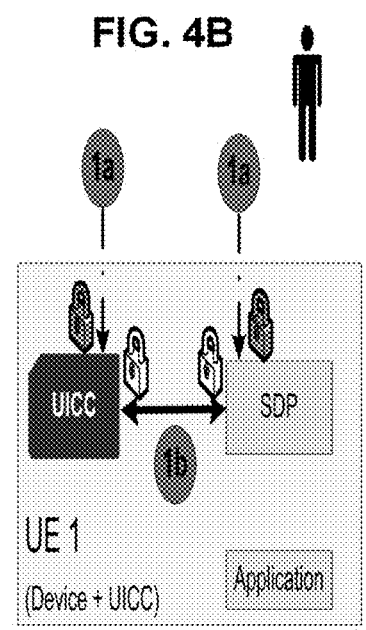
FIG. 4B
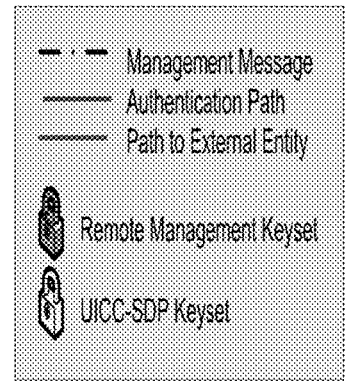

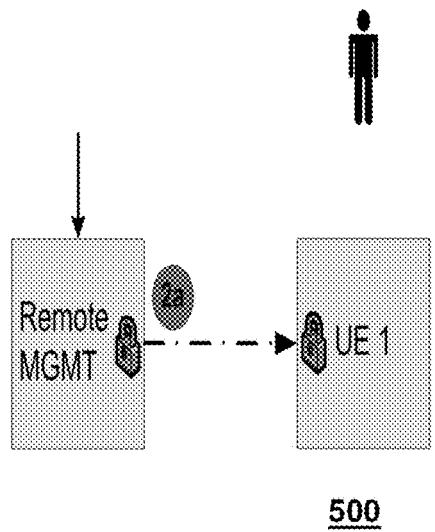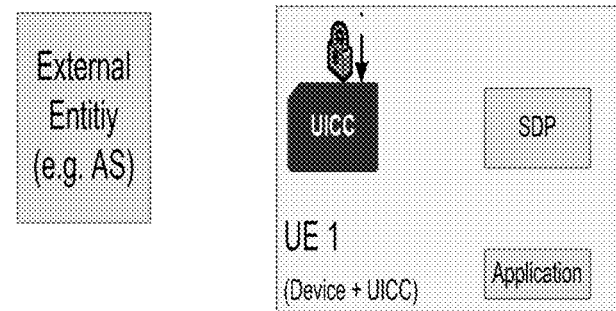
FIG. 5A  500
FIG. 5B
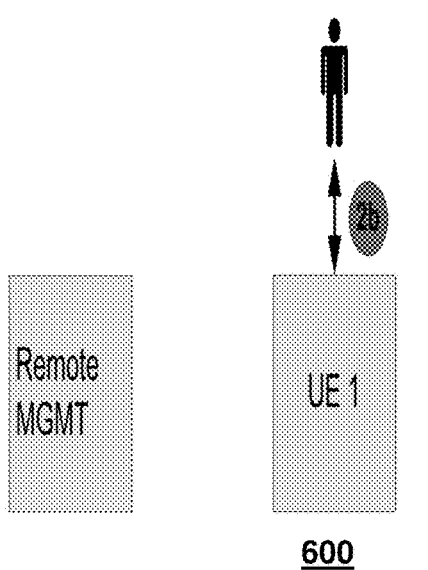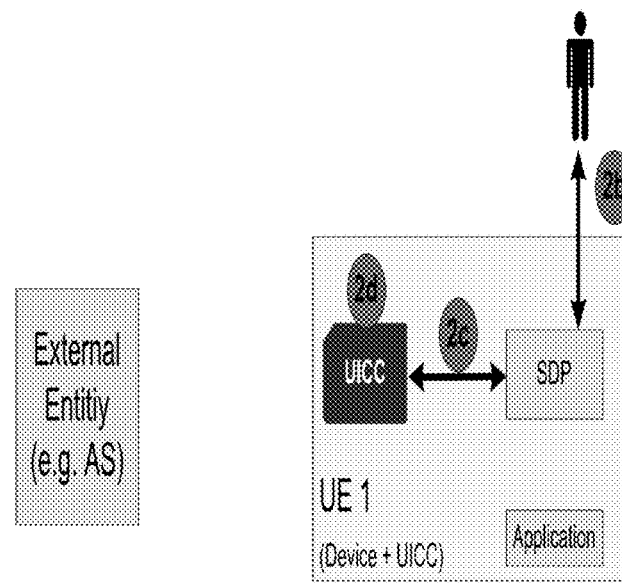
FIG. 6A  600
FIG. 6B

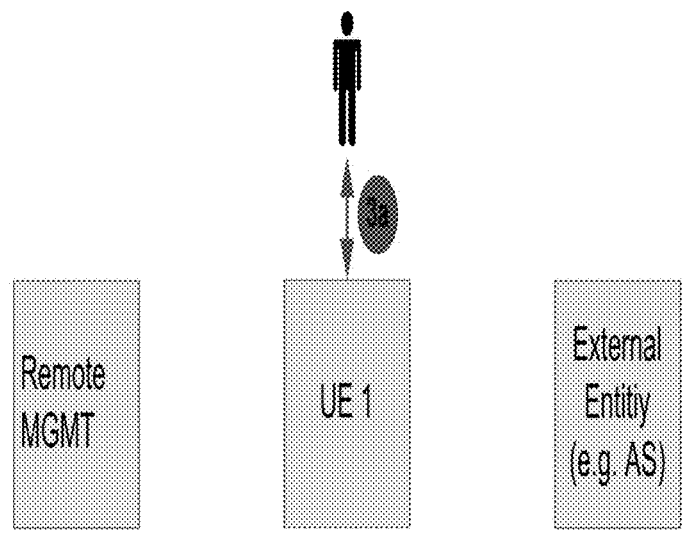
700
FIG. 7A
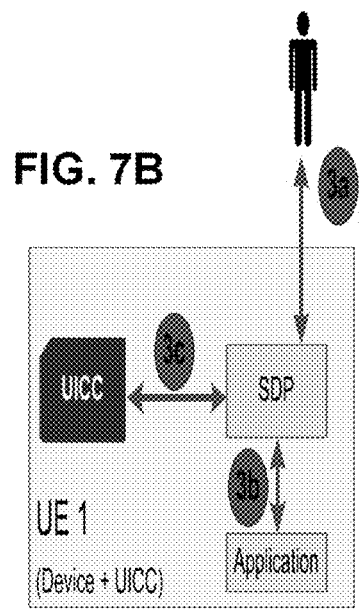
FIG. 7B
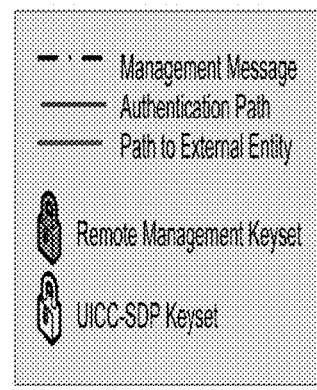

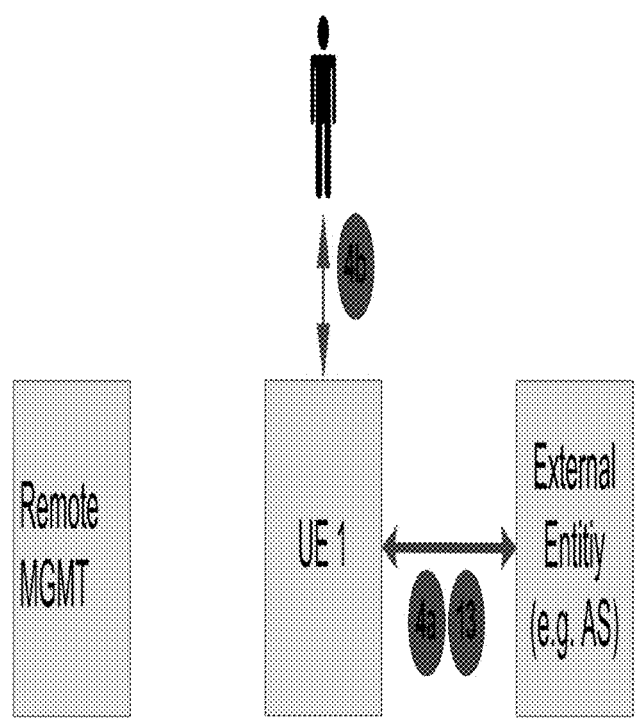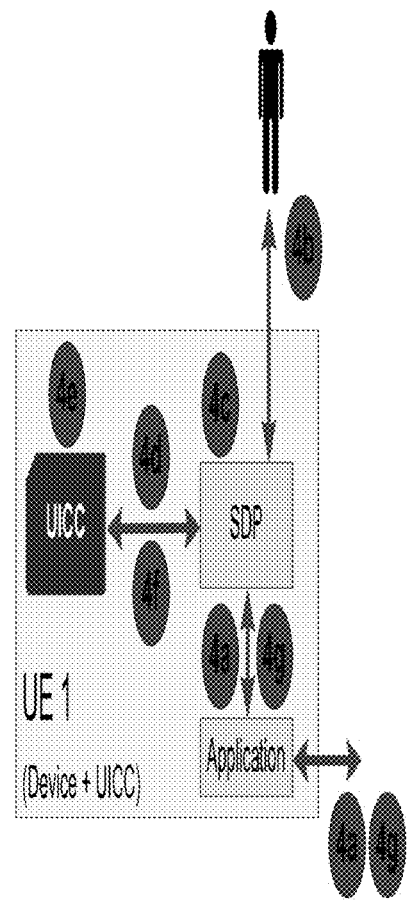
800
FIG. 8A
FIG. 8B

900

APPARATUS AND METHOD FOR SECURE AUTHENTICATION OF A COMMUNICATION DEVICE

CROSS REFERENCE TO RELATED APPLICATIONS

This application is a continuation of U.S. patent application Ser. No. 14/929,501 filed Nov. 2, 2015, which is a continuation of U.S. patent application Ser. No. 14/061,380 filed Oct. 23, 2013, now U.S. Pat. No. 9,208,300. The contents of the foregoing are hereby incorporated by reference into this application as if set forth herein in full.

FIELD OF THE DISCLOSURE

The subject disclosure relates to an apparatus and method for secure authentication of a communication device.

BACKGROUND

Electronic devices are being utilized with more frequency to conduct various types of transactions and exchanges of information. The use of external devices, such as web servers, often requires identifying that a user requesting a service is authorized to utilize the service. Allowing an unauthorized user to utilize services can be costly in terms of resources consumed, confidential information being exposed, and so forth.

BRIEF DESCRIPTION OF THE DRAWINGS

Reference will now be made to the accompanying drawings, which are not necessarily drawn to scale, and wherein:

FIGS. 4A-4B depict an illustrative embodiment of a system that can be used for provisioning devices that are engaged in securely authenticating a user of a communication device;

FIGS. 5A-5B and 6A-6B depict an illustrative embodiment of a system that can be used for configuring a communication device with baseline credentials for securely authenticating a user of the communication device;

FIGS. 7A-7B depict an illustrative embodiment of a system that can be used for registering applications that will utilize the secure authentication of the user of the communication device;

FIGS. 8A-8B depict an illustrative embodiment of a system that can be used for securely authenticating a user of a communication device;

DETAILED DESCRIPTION

Figure 1:
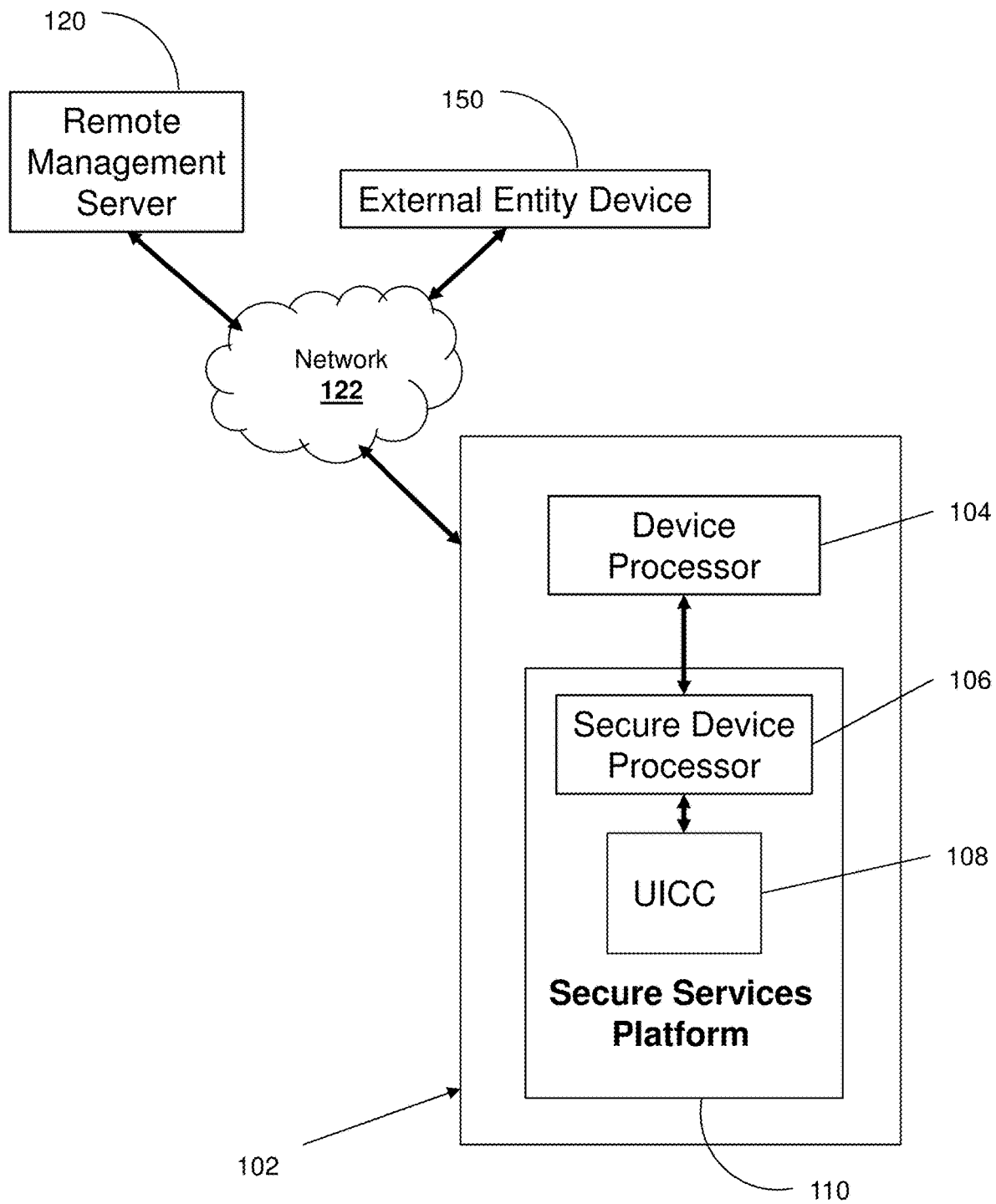
FIG. 1 depicts an illustrative embodiment of a system that enables use of a secure element and a secure device processor as part of a secure services platform for a secure authentication of a user of a communication device.

The subject disclosure describes, among other things, illustrative embodiments in which a user may be authenticated through a communication device (e.g., a smartphone, a tablet, and so forth) by using a secure element (e.g., which may exist within or be a Universal Integrated Circuit Card (UICC)) and a secure device processer (SDP) as an authentication platform. The credentials used to authenticate the user can be digital (e.g., binary) representations of items that can be used to verify a user's identity, including passwords, pin numbers, digital signatures, or biometric data (e.g., fingerprint, voiceprint, or faceprint). The UICC can be a highly secure computing platform for storing secrets such as encryption keys and authentication credentials, and can host and execute applets. The SDP can be a processor that is logically and/or physically separate from the device processor and can offer more security than the device processor, but not as much security as the UICC. Examples of an SDP include a Trusted Execution Environment (TEE) and an embedded Secure Element (eSE). In one or more embodiments, together, the UICC and SDP can provide a secure means of authenticating a user.

The secure element can contain an authentication management function which stores encrypted authentication credentials. In one embodiment, two types of credentials can be stored by the secure element: baseline credentials used to authenticate the user to the secure element and external credentials for external entities such as web-based email servers. In one or more embodiments, when prompted by an authentication processor function, the authentication management function can compare the stored authentication credentials (e.g., the baseline credentials) with those provided by the user to verify the identity of the user. In one or more embodiments, external credentials for external entities may be provided by the authentication management function if any are mapped to the baseline credential. In one or more embodiments, the external credential can be the execution of an operation, such as a cryptographic operation (e.g., a digital signature, a signed secret response to a challenge, and so forth). In some embodiments, the external credential can be used as a challenge response from the external entity device. In other embodiments, the external credential can be a combination of data such as a user ID and password.

In one or more embodiments, the SDP can contain the authentication processor function which performs one or more of the following tasks: processing requests for authentication from applications in the device (e.g., a web browser, NFC applet, and so forth) or external entities (e.g., application servers, NFC readers, and so forth); prompting the user to provide authentication credentials; processing authentication credentials for transmission to the authentication management function. In one or more embodiments, applications which interact with the authentication processor function are registered and associated with it.

One or more of the embodiments can use both the UICC and SDP together to provide a secure platform for user authentication. One or more of the embodiments can use the SDP to process user generated authentication information such as biometric data for transmission to the UICC. One or more of the embodiments can use the UICC to store user baseline credentials and use them to verify the user's identity. One or more of the embodiments can use the UICC to store credentials for external entities such as web-based email servers and map them to baseline credentials. One or more of the embodiments can use secure remote management of the UICC and SDP. One or more of the embodiments can use an authentication management function that may be located in the UICC. One or more of the embodiments can use an authentication processor function which is located in an SDP. One or more of the embodiments can use a remote management system which remotely manages the authentication management function and authentication processor function.

Other embodiments are included in the subject disclosure.

One embodiment of the subject disclosure includes a communication device having a secure element with a secure element memory including first executable instructions. The secure element, responsive to executing the first executable instructions, can perform first operations including receiving a baseline credential and an external credential, storing the baseline credential and the external credential in the secure element memory, and mapping the external credential to the baseline credential in the secure element memory. The communication device can also have a secure device processor having a secure device processor memory with second executable instructions. The secure device processor can be separate from the secure element and in communication with the secure element. The secure device processor, responsive to executing the second executable instructions, can perform second operations including receiving an application registration request where the receiving of the external credential by the secure element is responsive to the application registration request, receiving user input including a user credential, providing a request for an authentication to the secure element where the request for the authentication includes the user credential and enables the secure element to compare the user credential with the baseline credential to verify the authentication, receiving the authentication and the external credential from the secure element without receiving the baseline credential, and providing the external credential to an external entity device that is remote from the communication device One embodiment of the subject disclosure is a method including receiving, by a secure element of a communication device, a baseline credential and an external credential, storing the baseline credential and the external credential in a secure element memory of the secure element, and receiving, by a secure device processor of the communication device, an application registration request, wherein the secure device processor is separate from the secure element and in communication with the secure element. The method can include receiving, by the secure device processor, user input including a user credential. The method can include providing a request for an authentication from the secure device processor to the secure element, where the request for the authentication includes the user credential and enables the secure element to compare the user credential with the baseline credential to verify the authentication. The method can include receiving, by the secure device processor, the authentication and the external credential from the secure element without receiving the baseline credential. The method can include providing, by the secure device processor, the external credential to an external entity device that is remote from the communication device.

One embodiment of the subject disclosure is a computer readable storage device including instructions which, responsive to being executed by a secure element of a communication device, cause the secure element to perform operations that include receiving a baseline credential and an external credential. The secure element can store the baseline credential and the external credential in a secure element memory of the secure element, and can map the external credential to the baseline credential in the secure element memory. The secure element can receive a request for an authentication from a secure device processor of the communication device, where the secure device processor is separate from the secure element and in communication with the secure element, and where the request for the authentication includes a user credential inputted into the communication device. The secure element can compare the user credential with the baseline credential to verify the authentication. The secure element can provide the authentication and the external credential to the secure device processor without providing the baseline credential to enable the secure device processor to provide the external credential to an external entity device that is remote from the communication device.

In accordance with an embodiment of the disclosure, FIG. 1 depicts a system 100 that includes a communication device 102 connected to or otherwise in communication with a network 122 and provided with a secure services platform 110 enabling authentication of other communication devices and encrypted communication with those devices. Device 102 can be loaded with authentication applications (to the secure element and to the secure device processor, respectively), and can be personalized with baseline credentials. Applications can be registered and associated with the device 102 to enable the secure authentication by the device 102. The secure authentication by the device 102 can entail authenticating the user to the UICC and authenticating the user to an external entity.

It will be appreciated that the communication device 102 may be any device, including a user device, which has a secure element and a secure device processor. The term "user," in this example, refers to a human user of the communication device. However, in other embodiments, the user can be a machine that exchanges data with the communication device 102 after being authenticated to the communication device. Communication device 102 can include a device processor 104, a SDP 106 and a secure element 108. In this embodiment, secure element 108 can be a UICC. The UICC can be a secure computing platform and can offer a high level of security for storing encryption keys, authentication credentials, and the like. The UICC may be removable from the device. In other embodiments, the UICC may be embedded in the device and not removable. In other embodiments, the secure element 108 can be placed on a memory card or an embedded chip. The SDP 106 can be logically and/or physically separate from the device processor 104, and can be connected to both the device processor and the UICC 108. In this embodiment, the SDP 106 can offer a higher level of security than the device processor 104, and can store and execute secure applications. The SDP 106 can, for example, run applications in a trusted execution environment. The secure element 108 and SDP 106 together can form a secure services platform 110 resident on the device 102. In this embodiment, secure element 108, SDP 106 and device processor 104 can each have a security level associated therewith, and the security level associated with the SDP 106 can be intermediate between that of the secure element 108 and that of the device processor 104. The SDP and secure element 108 can use mutual authentication, as described in more detail below.

The secure element 108 and SDP 106 can communicate with a remote management (function) server 120, located remotely from device 102. The remote management server 120 can be a platform for provisioning and/or managing applications in the secure element 108 and SDP 106. The remote management server 120 can also manage data (such as keys, credentials, and so forth) that are used by the applications. Examples of remote management servers are described in U.S. patent application Ser. No. 13/679,479 filed on Nov. 16, 2012 and U.S. patent application Ser. No. 13/680,680 filed on Nov. 19, 2012, the disclosures of both of which are hereby incorporated by reference.

In this embodiment, user device 102 can be a wireless communication device connected to a cellular network 122. Network 122 can also be other types of networks operating according to various communication protocols, such as a WiFi network. In other embodiments, device 102 can be connected to other devices via a wired connection through a computer. In still other embodiments, user devices can communicate with each other using Bluetooth, infrared communications (IRDa) and/or near field communications (NFC). A communication session between user devices, wherein information is transferred between the users, can be effected by a wide variety of arrangements. A secure application server (SAS) can be used in some embodiments to establish a secure communication session between devices. However, a secure application server may not be used in embodiments where the communication session is established in a peer-to-peer manner, such as in Bluetooth, IRDa or NFC.

System 100 enables components of the secure services platform 110 (e.g., the secure element 108) to perform operations including receiving a baseline credential and an external credential, storing the baseline credential and the external credential in the secure element memory, and mapping the external credential to the baseline credential in the secure element memory. System 100 enables components of the secure services platform (e.g., a SDP 106) to perform operations including receiving an application registration request where the receiving of the external credential by the secure element 108 is responsive to the application registration request, receive user input including a user credential, provide a request for an authentication to the secure element, wherein the request for the authentication includes the user credential and enables the secure element to compare the user credential with the baseline credential to verify the authentication, receive the authentication and the external credential from the secure element without receiving the baseline credential, and provide the external credential to an external entity device 150 that is remote from the communication device 102. The external entity device 150 can be various types of devices, such as a third party web server, a network element operating an application function, and so forth. In one or more embodiments, the application registration request can be received from various sources, such as remotely from the external entity device or some other remote device. In other embodiments, the application registration request can be received locally, such as based on user input, from an application being executed by the device processor, or from an application being executed by another processor (e.g., the SDP) of the communication device.

In one or more embodiments, system 100 enables the secure element 108 to include a universal integrated circuit card, where the receiving of the baseline credential is from a remote management server 120 that is remote from the communication device 102 and the external entity device, and where the secure element and the SDP 106 are mutually authenticated with the remote management server using a remote management keyset. In one or more embodiments, the communication device 102 can include a device processor that is separate from the SDP 106 and in communication with the secure device processor, where the device processor facilitates wireless communications between the communication device and the remote management server 120, where the receiving of the application registration request is from an application being executed by the device processor, and where the receiving of the user input is in response to a prompt that is presented by the communication device responsive to the application being executed by the device processor. In one or more embodiments, the user credential can be inputted at a device other than communication device 102. For example, if User B's credentials are stored in device A, and if device A is to be used to authenticate user B, the SDP of device B could send the credential(s) inputted by user B to the SDP of device A. This channel could be encrypted. The encryption may not be based on User B credentials since user B has not been authenticated. In one embodiment continuing with this example, a remote management server can be utilized for this authentication. In other embodiments, the communication exchange can be peer-to-peer between the SDPs of the respective devices so that the remote management server is not utilized. For instance, in an example of authentication between end user devices, an SDP_SDP keyset can be utilized, which is similar to the bearer path authentication keyset described in U.S. patent application Ser. No. 14/023,932, the disclosure of which is hereby incorporated by reference. In one embodiment, the SDP_SDP keyset can be loaded to both SDPs (of the respective end user devices) by the remote management server prior to use. For example, this can occur when the applications are initially loaded. In addition to utilizing a bearer path authentication keyset (e.g., the SDP_SDP key set) to authenticate the two devices, the encryption between the two devices can be done using a bearer path encryption keyset as described in 50 of U.S. patent application Ser. No. 14/023,932 or a similar mechanism. In one embodiment, the UICC can store credentials provided by other users for a peer-to-peer service in which two (or more) users, with their respective devices, use the credentials stored in the other user's device for mutual authentication. In one or more embodiments, the communication device 102 can include a user interface, where the receiving of the baseline credential includes: receiving, by the SDP 106, biometric input captured at the user interface; converting, by the secure device processor, the biometric input into a binary biometric credential; providing the binary biometric credential from the secure device processor to the secure element 108; and encrypting, by the secure element, the binary biometric credential to generate the baseline credential. In one or more embodiments, the baseline credential can include a password, a pin number, a digital signature, or combinations thereof. In one or more embodiments, the baseline credential can include a finger print, a voice print, a face print, or combinations thereof. In one or more embodiments, the external credential can include a server login. In one or more embodiments, the receiving of the application registration request can be from the external entity device, and the receiving of the user input can be in response to a prompt that is presented by the communication device 102 responsive to the application registration request. In one or more embodiments, the communication device 102 can include a user interface, where the receiving of the baseline credential includes: receiving, by the SDP 106, user data inputted at the user interface; converting, by the secure device processor, the user data into a binary credential; providing the binary credential from the secure device processor to the secure element 108; and encrypting, by the secure element, the binary credential to generate the baseline credential. In one or more embodiments, the communication device can include a device processor that is separate from the SDP 106 and in communication with the secure device processor, where the device processor facilitates wireless communications between the communication device and a remote management server 120, where the device processor enables voice, video and/or data communication services to be provided by the communication device, where first executable instructions for the first operations are received by the secure element 108 from the remote management server, and where second executable instructions for the second operations are received by the secure device processor from the remote management server. In one or more embodiments, a user can have any number of credentials. In other embodiments, multiple users of a single device 102 can have their baseline credentials stored in the secure element 108. Device 102 enables the creation, storage and/or management of one or more credentials for each of a plurality of users.

Figure 2:
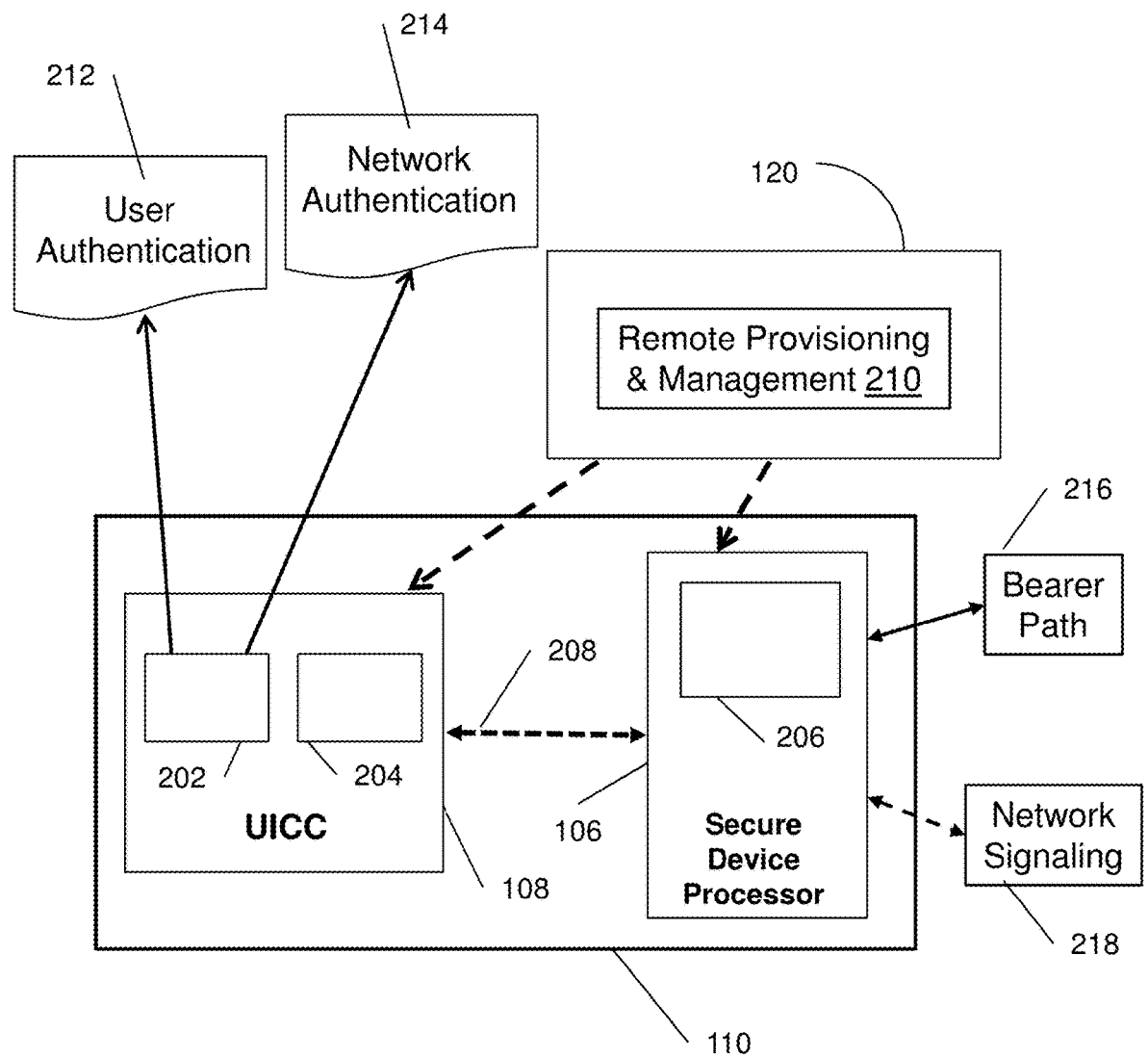
FIG. 2 depicts an illustrative embodiment of a system including the communication device of FIG. 1 implementing authentication and management functions.

FIG. 2 is a schematic illustration 200 showing details of a secure services platform 110, according to an embodiment of the disclosure, which can be used with the communication device 102 of FIG. 1. The secure element 108 (in this embodiment, a UICC) can contain an authentication management function 202 and a real-time encryption key generator 204. The authentication management function 202 can provide authentication services for the device. For example, the authentication management function 202 can support mutual authentication of devices, support a mutual authentication of the device, such as with the remote management server 120 of FIG. 1. As shown in FIG. 2, the authentication management function 202 can include a user authentication service 212 for authenticating the user to the device and a network authentication service 214 for authenticating the device to network equipment. The real-time encryption key generator 204 can supply encryption keys to a real-time encryption engine 206 which is located in the SDP 106. The real-time encryption engine 206 can encrypt and decrypt user information transmitted to or from a bearer path 216 that terminates at another device (e.g., another user device), and may encrypt and decrypt information transmitted on a signaling path 218 to the network. In another embodiment, the encryption engine can be loaded on a second secure element, separate from the secure element 108.

The remote management server 120 can perform a remote provisioning and management function 210 to load applications, content and/or other information, such as credentials (e.g., baseline credentials and external credentials) into the secure element (e.g., UICC) 108 and SDP 106. In this embodiment, the remote management server 120 can provision the authentication management function 202 and real-time encryption key generator 204 on the UICC 108, and can provision the real-time encryption engine 206 on the SDP 106. This can be done securely by the use of one or more remote management keysets. In one embodiment, before the secure services platform 110 can be used for communication, the SDP 106 can be authenticated by the UICC 108. In one embodiment, this can be done using a UICC-SDP keyset. The UICC-SDP keyset may be provisioned remotely by the remote management server 120 or locally by an authorized user. In this embodiment, after the UICC 108 and SDP 106 are mutually authenticated using the UICC-SDP keyset, they can communicate via a signaling path 208 within the secure services platform 110. The UICC-SDP keyset may be used for secure communication during initial loading and provisioning. However, the keys being utilized may be different. In one embodiment, the path between the UICC 108 and the SDP 106 can go through the device processor 104 rather than directly between the UICC and the SDP.

In this embodiment of FIG. 2, the secure services platform 110 enables secure authentication of a user based on a baseline credential that is received either from a remote management server 120 or is generated by the secure element 108 based on data received from the SDP 106. For instance, the secure element 108 can receive a baseline credential (e.g., a password, pin number, digital signature, and so forth) and can store the secure element without sharing the baseline credential with components outside of the secure element (e.g., the SDP 106 or the device processor 104). As another example, the SDP 106 can obtain data (e.g., user input of a finger print, voice print, face print, or other user authentication information). The SDP 106 can translate the received user input into a binary credential which is then provided to the secure element 108. The secure element 108 can then further transform the binary credential, such as based on encryption, to generate the baseline credential. Once generated, the baseline credential can remain stored in the secure element 108 without being provided to the SDP 106.

In one or more embodiments, the secure element can exclusively verify authentication based on the baseline credential and received user input compared thereto. In one or more embodiments, external credentials that are mapped to the baseline credential can be provided to the SDP 106 which then provides the external credential to an external device, such as providing a log-in identification to a web server during a log-in procedure.

Figure 3A:
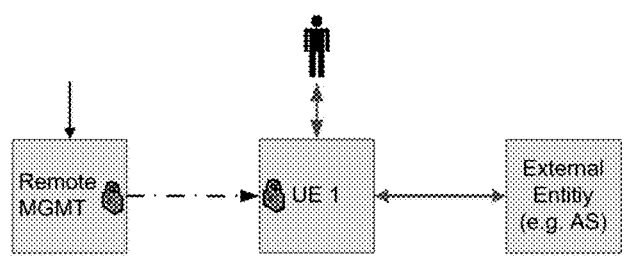
FIGS. 3A-3C depict an illustrative embodiment of a system that can be used for securely authenticating a user of a communication device.
Figure 3B:
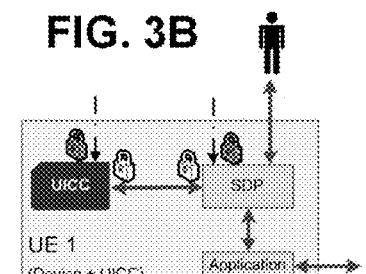
Figure 3C:
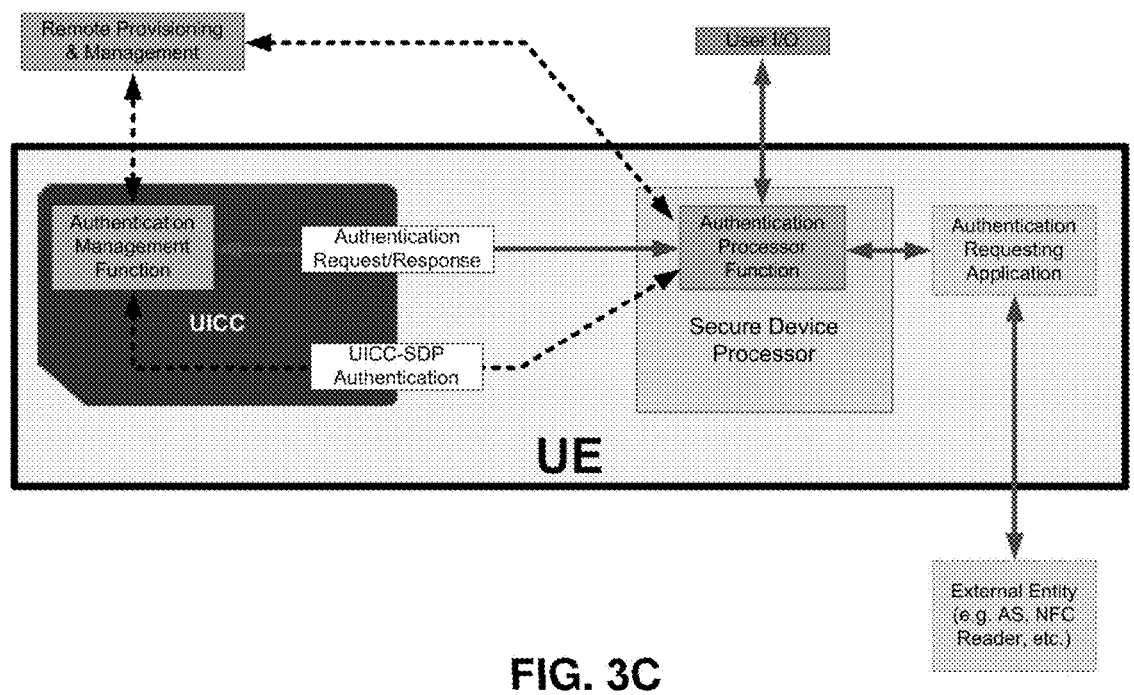

Referring to FIGS. 3A-C, a system 300 is depicted which illustrates providing user authentication at an end user device utilizing a secure element and a SDP. System 300 can include a platform (e.g., operated on the remote management server 120) to remotely provision and manage the applications on the UE. The remote management server 120 can create and load the necessary applications into both the UICC and SDP, as well as provisioning credentials (e.g., baseline and external credentials). In one or more embodiments, this can be done securely by the use of one or more remote management keysets. These keysets can be used to mutually authenticate the UICC 108 and SDP 106 with the remote management server 120 and to enable encryption between them.

In one or more embodiments, the SDP can be authenticated by the UICC using a UICC-SDP Keyset. This can occur once the applications have been loaded by the remote management server. In one or more embodiments, the user's baseline credentials can be loaded and stored in the authentication management function, which can also include encrypting the baseline credentials. These baseline credentials can be loaded by the remote management server or they can be created through the use of the authentication processor function. In one or more embodiments, applications register with the authentication processor function in order to enable the user authentication process. In one or more embodiments, the baseline credentials can include one or more of pin codes, passwords, and biometric data such as finger prints, voice prints, or face prints. In one or more embodiments, the external credentials being stored for use by external entities (e.g., a web-based email server) can include login-in information and so forth, and can be mapped to the baseline credentials.

In one or more embodiments, the secure element can compare the baseline credential with credentials supplied by the user during the lifecycle of the service. In one or more embodiments, baseline credentials do not leave the secure element, while external credentials can be provided from the secure element to an external entity after authentication with the baseline credential. In one or more embodiments, baseline credentials may be loaded into the secure element from the network using a high security process based on Global-Platform or loaded directly by the user via a user interface (e.g., keyboard, audio recording component image capture components, and so forth). In one or more embodiments, user credentials (e.g., corresponding or otherwise associated with the baseline credentials) provided by the user are processed by the SDP in the device for transmission to the secure element. In one or more embodiments, applications that use secure element-based authentication register and associate with the SDP before the secure authentication process described herein may be utilized for the applications.

Referring to FIGS. 4A-C, system 400 is depicted which illustrates loading or otherwise provisioning the end user device with the applications that are utilized by the secure services platform for performing the secure user authentication process. If the applications have not been loaded at the time of manufacture, then at 1*a*, upon receiving a request for the service, the remote management server can download the authentication management function to the secure element and the authentication processor function to the SDP. In one embodiment, remote management keysets can be used to securely transmit information from the remote management server to the end user device. This process can involve mutual authentication and encryption. At 1*b*, the secure element and the SDP mutually authenticate with each other once the two are provisioned using the UICC-SDP Keyset.

In one or more embodiments, there are two ways that the user baseline credentials can be loaded into the authentication management function: through the remote management server or through the authentication processor function. Referring to FIGS. 5A-B, system 500 is depicted which illustrates one of the ways of loading the baseline credentials. At 2*a*, if the remote management server is in possession of the user's baseline credentials, it may download them to the authentication management function using the remote management keyset.

Referring FIGS. 6A-B, system 600 is depicted which illustrates another way of loading or otherwise providing the baseline credentials to the secure element. At 2*b*, the authentication processor function can prompt the user to provide the user baseline credentials. In one embodiment, the user can choose the type of credential to be stored (e.g. password, pin, biometric data, and so forth). At 2*c*, the authentication processor function can convert the credential supplied by the user into binary form and transmit it to the authentication management function. In one embodiment, this step can require authentication between the authentication management function and the authentication processor function. At 2*d*, the authentication management function can encrypt the credential and store it as the baseline credential. In one or more embodiments, additional authentication between the secure element and the SDP can be imposed to enable the generation of the baseline credential from the data provided by the SDP.

Referring to FIGS. 7A-C, system 700 is depicted which illustrates enabling the registration of application so that the applications can utilize the secure user authentication process described herein. For example, applications can be required to register and associate with the authentication processor function in order to use it. At 3*a*, this can be done explicitly by the user or at 3*b* implicitly by the application or the authentication processor function. At 3*c*, once registered, credentials for external entities (e.g. login for a web-based email server) can provided to the authentication management function, processed, and stored in the authentication management function. The application management function can contain a mapping between the baseline credentials and the external credentials for external entities. These external credentials may be provided explicitly by the user or implicitly by an application. In one or more embodiments, additional authentication between the secure element and the SDP can be imposed to enable the process.

Referring to FIGS. 8A-C, system 800 is depicted which illustrates the user authentication process. At 4*a*, either or both of an application within the device or an external entity device requests the authentication processor function to authenticate the user. At 4*b*, the authentication processor function can select the type of credential to be supplied and can request the user to supply it such as via a prompt displayed or otherwise rendered at the end user device. At 4*c*, once the user has provided the requested authentication credential, the authentication processor function can convert it to binary form for transmission to the application management function. At 4*d*, the authentication processor function can transmit the credential to the authentication management function for verification. If credentials for an external entity are required, the authentication processor function can request them from the authentication management function. At 4*e*, the authentication management function can compare the credential that was just provided by the user in step 4*b* to the baseline credential stored within it. At 4*f*, the authentication management function can respond to the request from the authentication processor function indicating whether or not the supplied credential matches the baseline credential. The authentication processor function can provide the credential for an external entity if it was requested to do so and if the user is verified. At 4*g*, the authentication processor function can notify the application whether or not the user is authenticated. This notification can be passed on to an external entity device. External entity credentials can be passed on to the external entity device if provided by the authentication processor function. In one or more embodiments, additional authentication between the secure element and the SDP can be imposed to enable the process.

Figure 9:
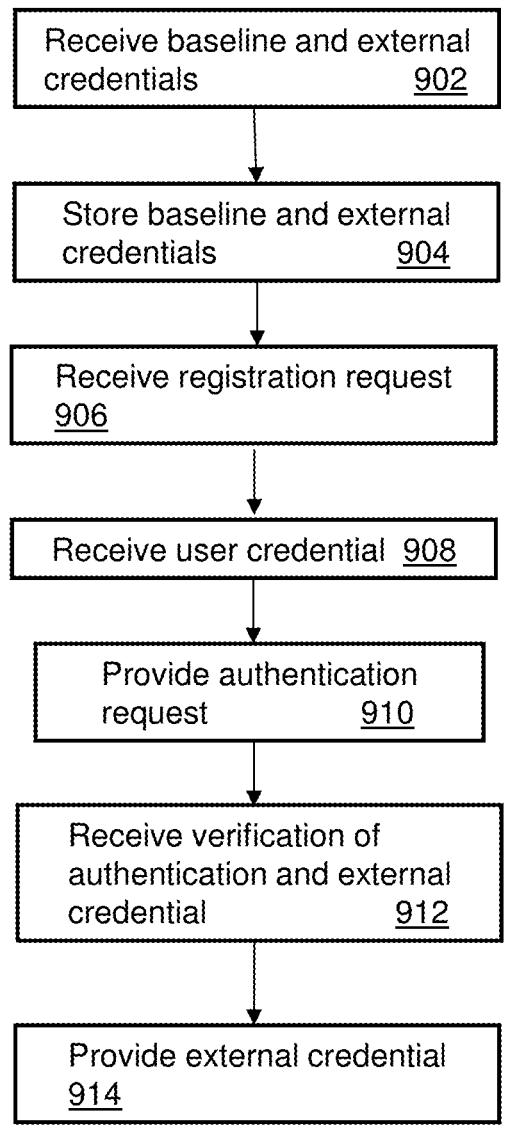
FIG. 9 depicts an illustrative embodiment of a method used in portions of the systems described in FIGS. 1-8B.

FIG. 9 depicts an illustrative embodiment of a method for providing a secure authentication utilizing baseline credentials and external credentials. All or a portion of the steps of method 900 can be performed by various devices, including end user devices such as device 102 including secure services platform 110. Method 900 can begin at 902 by receiving a baseline credential. The baseline credential can be received by secure element 108. In some instances, an external credential can also be received, such as by the secure element 108. At 904, the baseline credential and the external credential can be stored, such as in a secure element memory of the secure element.

At 906, an application registration request can be received. The request can be received by SDP 106. At 908, a user credential can be received. In one or more embodiments, the user credential can be received by the SDP 106 as user input in response to a prompt displayed or otherwise rendered at the communication device 102. For instance, the device processor 104 can present a prompt requesting a user credential, such as in response to a request from an application being executed at the communication device 102 and/or in response to a request from an external entity device (e.g., a web server). In this example, the device processor 104 can provide the SDP 106 with the received user credential.

At 910, a request for an authentication can be generated, such as being provided from the SDP 106 to the secure element 108. The request for the authentication can include the user credential and can enable or otherwise request that the secure element 108 compare the user credential with the baseline credential to verify the authentication. At 912, the verified authentication can be received by the SDP 106 without receiving the baseline credential. In one or more embodiments, any external credential that has been mapped to the baseline credential can also be provided by the secure element to the SDP 106. At 914, the external credential can be provided, such as by the SDP 106, to an external entity device (e.g., a web server during a log-in procedure) that is remote from the communication device 102. In one or more embodiments, the SDP 106 may notify the external entity device and/or the application (e.g., being executed by the device processor or other component) that the user has been authenticated without providing an external credential.

In one or more embodiments, the secure element 108 can map the external credential to the baseline credential in the secure element memory. In one or more embodiments, the receiving of the external credential by the secure element 108 can be responsive to the application registration request. In one or more embodiments, the device 102 can provide voice video and/or data communication services utilizing the device processor 104 that is separate from the secure device processor and in communication with the SDP 106, where the device processor facilitates wireless communications between the communication device and a remote management server 120, and where the baseline credential is received from the remote management server. In one or more embodiments, wherein the receiving of the baseline credential can include: receiving, by the SDP 106, biometric input captured at a user interface of the communication device 102; converting, by the secure device processor, the biometric input into a binary biometric credential; providing the binary biometric credential from the secure device processor to the secure element 108; and encrypting, by the secure element, the binary biometric credential to generate the baseline credential. In one or more embodiments, the baseline credential can include one or more of a password, a pin number, or digital signature. In one or more embodiments, the baseline credential can include one or more of a finger print, a voice print, or a face print. In one or more embodiments, the receiving of the application registration request can be from the external entity device, where the receiving of the user input is in response to a prompt that is presented by the communication device 102 responsive to the application registration request.

Figure 10:
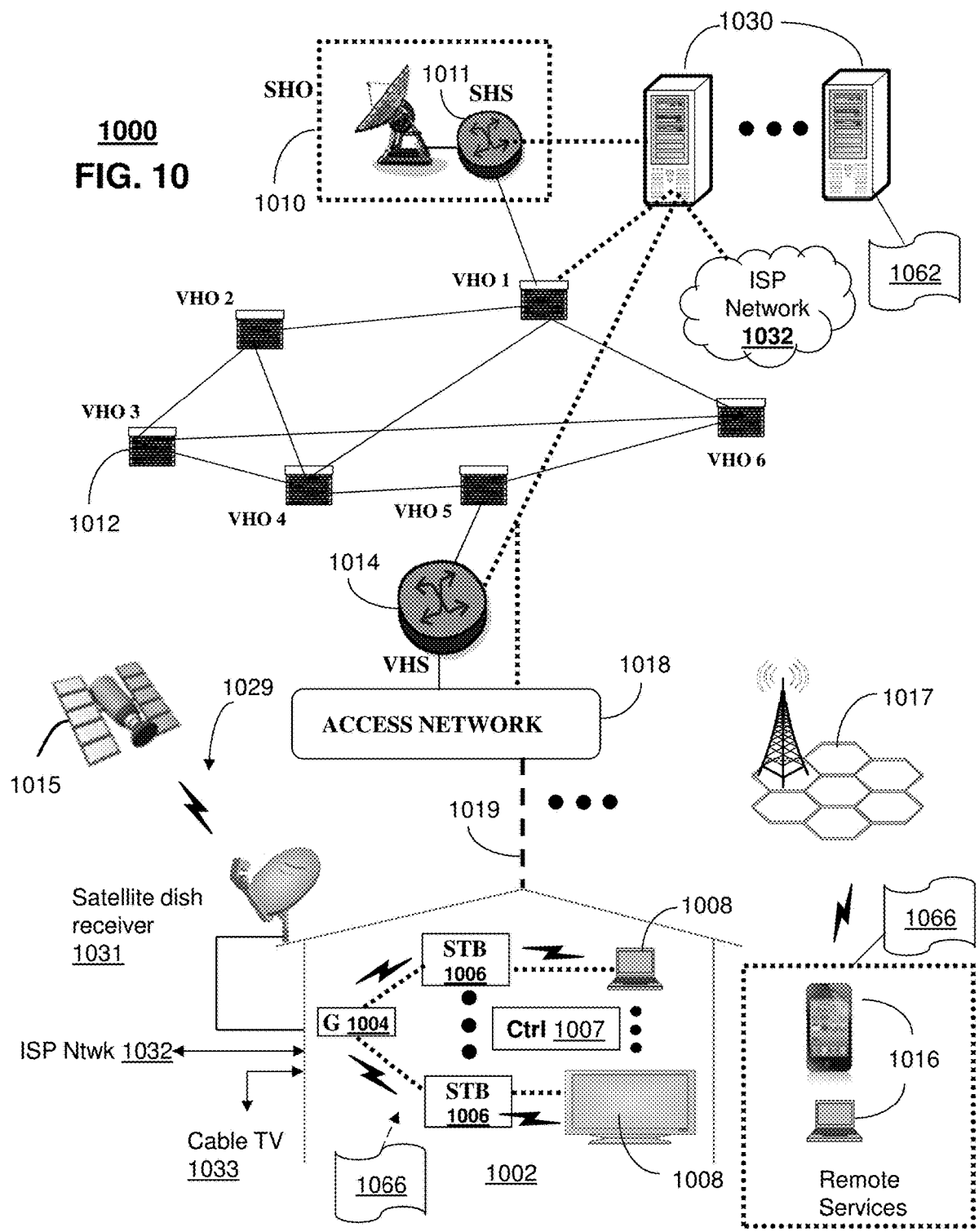
FIG. 10 depicts an illustrative embodiment of a communication system that provides media services including secure authentication of a user of a communication device.

FIG. 10 depicts an illustrative embodiment of a communication system 1000 for delivering media content. The communication system 1000 can represent an Internet Protocol Television (IPTV) media system. Communication system 1000 can be overlaid or operably coupled with systems 100, 200 of FIGS. 1 and 2 as another representative embodiment of communication system 1000. In one or more embodiments, system 1000 enables utilizing both the secure element (e.g., UICC) and SDP together to provide a secure platform for user authentication, utilizing the SDP to process user generated authentication information such as biometric data for transmission to the UICC, utilizing the UICC to store user baseline credentials and use them to verify the user's identity, utilizing the UICC to store credentials for external entities such as web-based email servers and map them to baseline credentials, and/or secure remote management of the UICC and SDP.

The IPTV media system can include a super head-end office (SHO) 1010 with at least one super headend office server (SHS) 1011 which receives media content from satellite and/or terrestrial communication systems. In the present context, media content can represent, for example, audio content, moving image content such as 2D or 3D videos, video games, virtual reality content, still image content, and combinations thereof. The SHS server 1011 can forward packets associated with the media content to one or more video head-end servers (VHS) 1014 via a network of video head-end offices (VHO) 1012 according to a multicast communication protocol.

The VHS 1014 can distribute multimedia broadcast content via an access network 1018 to commercial and/or residential buildings 1002 housing a gateway 1004 (such as a residential or commercial gateway). The access network 1018 can represent a group of digital subscriber line access multiplexers (DSLAMs) located in a central office or a service area interface that provide broadband services over fiber optical links or copper twisted pairs 1019 to buildings 1002. The gateway 1004 can use communication technology to distribute broadcast signals to media processors 1006 such as Set-Top Boxes (STBs) which in turn present broadcast channels to media devices 1008 such as computers or television sets managed in some instances by a media controller 1007 (such as an infrared or RF remote controller).

The gateway 1004, the media processors 1006, and media devices 1008 can utilize tethered communication technologies (such as coaxial, powerline or phone line wiring) or can operate over a wireless access protocol such as Wireless Fidelity (WiFi), Bluetooth, Zigbee, or other present or next generation local or personal area wireless network technologies. By way of these interfaces, unicast communications can also be invoked between the media processors 1006 and subsystems of the IPTV media system for services such as video-on-demand (VoD), browsing an electronic programming guide (EPG), or other infrastructure services.

A satellite broadcast television system 1029 can be used in the media system of FIG. 10. The satellite broadcast television system can be overlaid, operably coupled with, or replace the IPTV system as another representative embodiment of communication system 1000. In this embodiment, signals transmitted by a satellite 1015 that include media content can be received by a satellite dish receiver 1031 coupled to the building 1002. Modulated signals received by the satellite dish receiver 1031 can be transferred to the media processors 1006 for demodulating, decoding, encoding, and/or distributing broadcast channels to the media devices 1008. The media processors 1006 can be equipped with a broadband port to an Internet Service Provider (ISP) network 1032 to enable interactive services such as VoD and EPG as described above.

In yet another embodiment, an analog or digital cable broadcast distribution system such as cable TV system 1033 can be overlaid, operably coupled with, or replace the IPTV system and/or the satellite TV system as another representative embodiment of communication system 1000. In this embodiment, the cable TV system 1033 can also provide Internet, telephony, and interactive media services.

The subject disclosure can apply to other present or next generation over-the-air and/or landline media content services system.

Some of the network elements of the IPTV media system can be coupled to one or more computing devices 1030, a portion of which can operate as a web server for providing web portal services over the ISP network 1032 to wireline media devices 1008 or wireless communication devices 1016.

Communication system 1000 can also provide for computing devices 1030 to function as a remote management server (herein referred to as server 1030). The server 1030 can use computing and communication technology to perform function 1062, which can include among other things, remotely managing the authentication management function and the authentication processor function, providing baseline credentials to the secure element, engaging in a mutual authentication with the secure element and the SDP utilizing remote keysets.

Functions 1066 can include functions being performed at the secure element 108 including receiving a baseline credential and an external credential, storing the baseline credential and the external credential in the secure element memory, and mapping the external credential to the baseline credential in the secure element memory. Functions 1066 can also include functions being performed at the secure device processor 106 such as receiving an application registration request where the receiving of the external credential by the secure element is responsive to the application registration request, receiving user input including a user credential, providing a request for an authentication to the secure element where the request for the authentication includes the user credential and enables the secure element to compare the user credential with the baseline credential to verify the authentication, receiving the authentication and the external credential from the secure element without receiving the baseline credential, and providing the external credential to an external entity device that is remote from the communication device.

Multiple forms of media services can be offered to media devices over landline technologies such as those described above. Additionally, media services can be offered to media devices by way of a wireless access base station 1017 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 11:
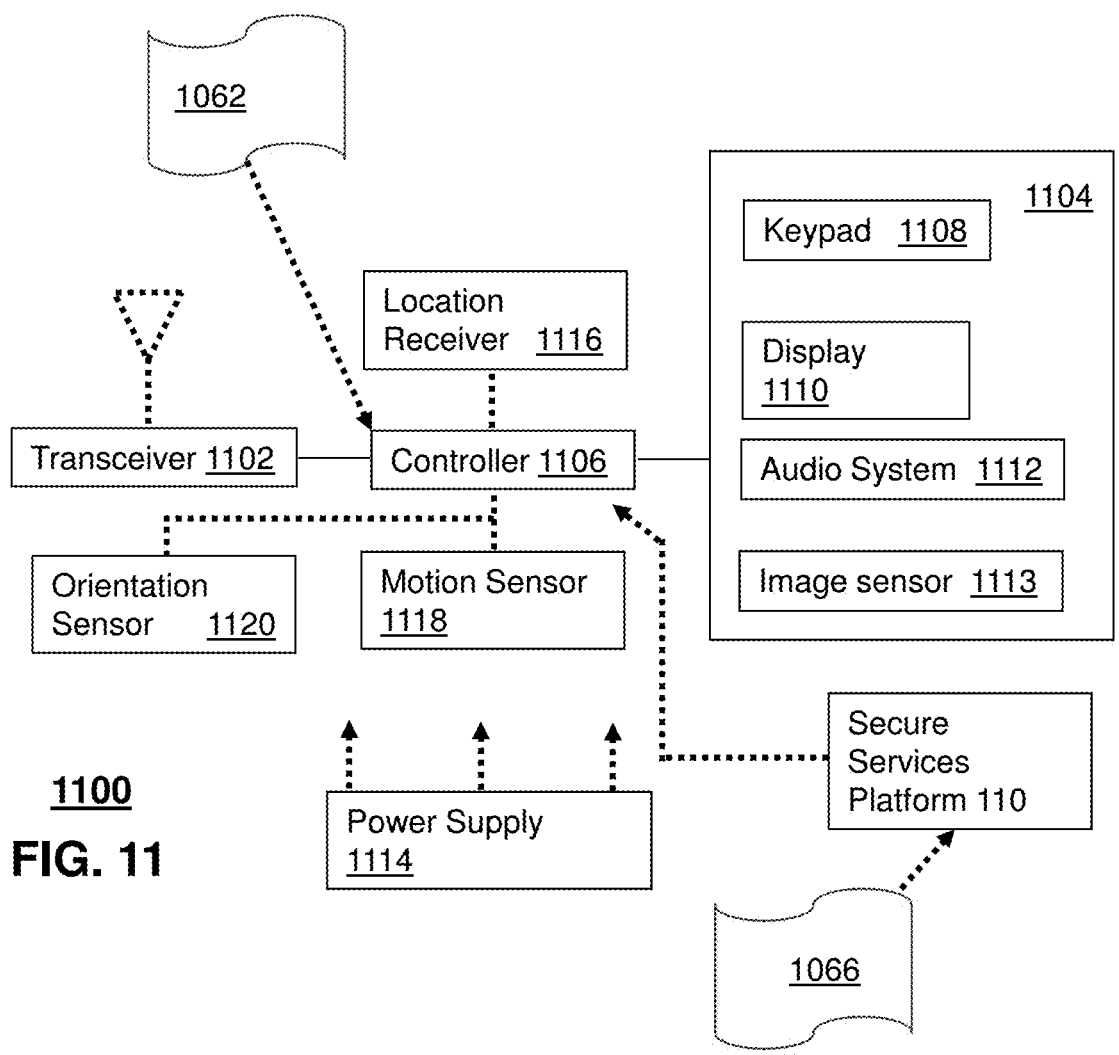
FIG. 11 depicts an illustrative embodiment of a communication device that can securely authenticate its user.

FIG. 11 depicts an illustrative embodiment of a communication device 1100. Communication device 1100 can serve in whole or in part as an illustrative embodiment of the devices depicted in FIGS. 1-8 and 10. For instance, device 1100 can include a secure element and a secure device processor in the secure services platform 110 which perform the functions described in the exemplary embodiments herein.

In one or more embodiments, the secure element of device 1110 can perform operations including receiving a baseline credential and an external credential, storing the baseline credential and the external credential in a secure element memory of the secure element, and mapping the external credential to the baseline credential in the secure element memory. The secure element can receive a request for an authentication from a secure device processor of the communication device, where the secure device processor is separate from the secure element and in communication with the secure element, and where the request for the authentication includes a user credential inputted into the communication device. The secure element can compare the user credential with the baseline credential to verify the authentication, and can provide the authentication and the external credential to the secure device processor without providing the baseline credential to enable the secure device processor to provide the external credential to an external entity device that is remote from the communication device.

In one or more embodiments, the receiving of the baseline credential by the device 1100 can include receiving a binary biometric credential from the secure device processor where the binary biometric credential is generated by the secure device processor by converting biometric input captured at a user interface of the communication device into the binary biometric credential, and encrypting the binary biometric credential to generate the baseline credential.

In one or more embodiments, the baseline credential can be received by the secure element from a remote management server that is in wireless communication with the communication device 1100 via a device processor of the communication device 1100 that is separate from the secure device processor and in communication with the secure device processor, where keysets are utilized for mutual authentication of the secure element and the secure device processor with the remote management server, and wherein the device processor enables voice communication services at the communication device.

To enable these features, communication device 1100 can comprise a wireline and/or wireless transceiver 1102 (herein transceiver 1102), a user interface (UI) 1104, a power supply 1114, a location receiver 1116, a motion sensor 1118, an orientation sensor 1120, and a controller 1106 for managing operations thereof. The transceiver 1102 can support short-range or long-range wireless access technologies such as Bluetooth, ZigBee, WiFi, DECT, or cellular communication technologies, just to mention a few. Cellular technologies can include, for example, CDMA-1x, UMTS/HSDPA, GSM/GPRS, TDMA/EDGE, EV/DO, WiMAX, SDR, LTE, NFC, as well as other next generation wireless communication technologies as they arise. The transceiver 1102 can also be adapted to support circuit-switched wireline access technologies (such as PSTN), packet-switched wireline access technologies (such as TCP/IP, VoIP, etc.), and combinations thereof.

The UI 1104 can include a depressible or touch-sensitive keypad 1108 with a navigation mechanism such as a roller ball, a joystick, a mouse, or a navigation disk for manipulating operations of the communication device 1100. The keypad 1108 can be an integral part of a housing assembly of the communication device 1100 or an independent device operably coupled thereto by a tethered wireline interface (such as a USB cable) or a wireless interface supporting for example Bluetooth. The keypad 1108 can represent a numeric keypad commonly used by phones, and/or a QWERTY keypad with alphanumeric keys. The UI 1104 can further include a display 1110 such as monochrome or color LCD (Liquid Crystal Display), OLED (Organic Light Emitting Diode) or other suitable display technology for conveying images to an end user of the communication device 1100. In an embodiment where the display 1110 is touch-sensitive, a portion or all of the keypad 1108 can be presented by way of the display 1110 with navigation features.

The display 1110 can use touch screen technology to also serve as a user interface for detecting user input. As a touch screen display, the communication device 1100 can be adapted to present a user interface with graphical user interface (GUI) elements that can be selected by a user with a touch of a finger. The touch screen display 1110 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 1110 can be an integral part of the housing assembly of the communication device 1100 or an independent device communicatively coupled thereto by a tethered wireline interface (such as a cable) or a wireless interface.

The UI 1104 can also include an audio system 1112 that utilizes audio technology for conveying low volume audio (such as audio heard in proximity of a human ear) and high volume audio (such as speakerphone for hands free operation). The audio system 1112 can further include a microphone for receiving audible signals of an end user. The audio system 1112 can also be used for voice recognition applications. The UI 1104 can further include an image sensor 1113 such as a charged coupled device (CCD) camera for capturing still or moving images.

The power supply 1114 can utilize common power management technologies such as replaceable and rechargeable batteries, supply regulation technologies, and/or charging system technologies for supplying energy to the components of the communication device 1100 to facilitate long-range or short-range portable applications. Alternatively, or in combination, the charging system can utilize external power sources such as DC power supplied over a physical interface such as a USB port or other suitable tethering technologies.

The location receiver 1116 can utilize location technology such as a global positioning system (GPS) receiver capable of assisted GPS for identifying a location of the communication device 1100 based on signals generated by a constellation of GPS satellites, which can be used for facilitating location services such as navigation. The motion sensor 1118 can utilize motion sensing technology such as an accelerometer, a gyroscope, or other suitable motion sensing technology to detect motion of the communication device 1100 in three-dimensional space. The orientation sensor 1120 can utilize orientation sensing technology such as a magnetometer to detect the orientation of the communication device 1100 (north, south, west, and east, as well as combined orientations in degrees, minutes, or other suitable orientation metrics).

The communication device 1100 can use the transceiver 1102 to also determine a proximity to a cellular, WiFi, Bluetooth, or other wireless access points by sensing techniques such as utilizing a received signal strength indicator (RSSI) and/or signal time of arrival (TOA) or time of flight (TOF) measurements. The controller 1106 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 1100.

Other components not shown in FIG. 11 can be used in one or more embodiments of the subject disclosure. For instance, the communication device 1100 can include a reset button (not shown). The reset button can be used to reset the controller 1106 of the communication device 1100. In yet another embodiment, the communication device 1100 can also include a factory default setting button positioned, for example, below a small hole in a housing assembly of the communication device 1100 to force the communication device 1100 to re-establish factory settings. In this embodiment, a user can use a protruding object such as a pen or paper clip tip to reach into the hole and depress the default setting button. The communication device 1100 can also include a slot for adding or removing an identity module such as a Subscriber Identity Module (SIM) card which, in some embodiments, can be the secure element or UICC. SIM cards can be used for identifying subscriber services, executing programs, storing subscriber data, and so forth.

The communication device 1100 as described herein can operate with more or less of the circuit components shown in FIG. 11. These variant embodiments can be used in one or more embodiments of the subject disclosure.

The communication device 1100 can be adapted to perform the functions of the media processor 1006, the media devices 1008, or the portable communication devices 1016 of FIG. 10. It will be appreciated that the communication device 1100 can also represent other devices that can operate in communication system 1000 of FIG. 10, such as a gaming console and a media player.

The communication device 1100 shown in FIG. 11 or portions thereof can serve as a representation of one or more of the devices of FIGS. 1-8 and 10 including end user devices, customer premises equipment, remote management servers, and/or external entity devices. In one or more embodiments, the external entity device can be operated by or affiliated with a third party entity that is different from and/or independent of the service provider operating the remote management server. In addition, the controller 1106 can perform the functions 1062 or 1066.

Upon reviewing the aforementioned embodiments, it would be evident to an artisan with ordinary skill in the art that said embodiments can be modified, reduced, or enhanced without departing from the scope of the claims described below. For example, generating the baseline credential (by the secure element) from binary data (e.g., converted user input) provided by the SDP can include adding additional information to the binary data to generate an adjusted binary data and then encrypting (by the secure element) the adjusted binary data. The additional information can be in various forms, such as information received from the remote management server that is associated with the user's identity.

Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 12:
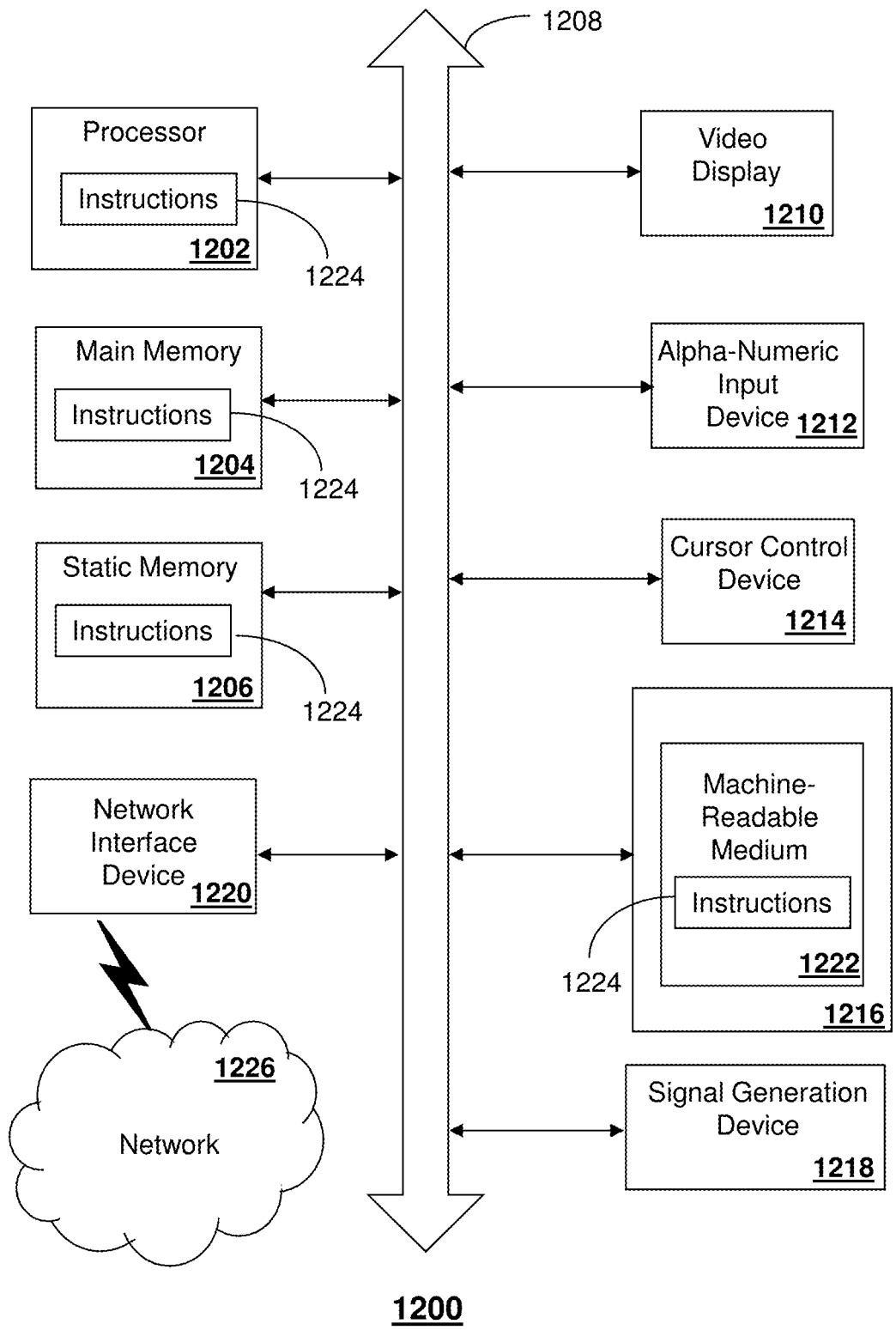
FIG. 12 is a diagrammatic representation of a machine in the form of a computer system within which a set of instructions, when executed, may cause the machine to perform any one or more of the methods described herein.

FIG. 12 depicts an exemplary diagrammatic representation of a machine in the form of a computer system 1200 within which a set of instructions, when executed, may cause the machine to perform any one or more of the methods described above. One or more instances of the machine can operate, for example, as the remote management server, the external entity device, the secure services platform, and so forth. In some embodiments, the machine may be connected (e.g., using a network 1226) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1200 may include a processor (or controller) 1202 (e.g., a central processing unit (CPU), a graphics processing unit (GPU, or both), a main memory 1204 and a static memory 1206, which communicate with each other via a bus 1208. The computer system 1200 may further include a display unit 1210 (e.g., a liquid crystal display (LCD)), a flat panel, or a solid state display. The computer system 1200 may include an input device 1212 (e.g., a keyboard), a cursor control device 1214 (e.g., a mouse), a disk drive unit 1216, a signal generation device 1218 (e.g., a speaker or remote control) and a network interface device 1220. In distributed environments, the embodiments described in the subject disclosure can be adapted to utilize multiple display units 1210 controlled by two or more computer systems 1200. In this configuration, presentations described by the subject disclosure may in part be shown in a first of the display units 1210, while the remaining portion is presented in a second of the display units 1210.

The disk drive unit 1216 may include a tangible computer-readable storage medium 1222 on which is stored one or more sets of instructions (e.g., software 1224) embodying any one or more of the methods or functions described herein, including those methods illustrated above. The instructions 1224 may also reside, completely or at least partially, within the main memory 1204, the static memory 1206, and/or within the processor 1202 during execution thereof by the computer system 1200. The main memory 1204 and the processor 1202 also may constitute tangible computer-readable storage media.

Dedicated hardware implementations including, but not limited to, application specific integrated circuits, programmable logic arrays and other hardware devices that can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1222 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP, NFC) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee, NFC), and long-range communications (e.g., WiMAX, GSM, CDMA, LTE) can be used by computer system 1200.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure. Additionally, features such as components or steps that are positively recited in one or more of the exemplary embodiments can also be expressly excluded from the exemplary embodiments.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A communication device comprising:
   a secure element having a secure computing platform including a secure element memory with first executable instructions, wherein the secure element, responsive to executing the first executable instructions, performs first operations comprising:
      receiving a baseline credential and an external credential, the baseline credential comprising a biometric credential received from a server that is remote from the communication device; and
      mapping the external credential to the baseline credential in the secure element memory;
   a secure device processor having a secure device processor memory with second executable instructions, wherein the secure device processor is separate from the secure element and in communication with the secure element, wherein the secure device processor, responsive to executing the second executable instructions, performs second operations comprising:
      receiving an application registration request based on the application being executed by the communication device;
      obtaining a user credential in response to the application registration request;
      providing a request for an authentication to the secure element, wherein the request for the authentication includes the user credential and enables the secure element to compare the user credential with the baseline credential to determine a match between the user credential and the baseline credential to verify the authentication;
      receiving the authentication and the external credential from the secure element without receiving the baseline credential; and
      providing the external credential to an external entity device that is remote from the communication device to enable access to services provided by the external entity device; and
   a device processor that is separate from the secure element and the secure device processor and in communication with the secure device processor, wherein the device processor facilitates wireless communications between the communication device and the external entity device, wherein the device processor enables voice, video and data communication services to be provided by the communication device, wherein the device processor sends the application registration request based on the application being executed by the communication device, and wherein the application registration request is received by the secure device processor via the second operations.

2. The communication device of claim 1, wherein the server that is remote from the communication device is a remote management server.

3. The communication device of claim 1, wherein the obtaining of the user credential is in response to a prompt that is presented by the communication device responsive to the application being executed by the device processor.

4. The communication device of claim 1, further comprising a user interface, wherein the second operations further comprise:
   receiving, by the secure device processor, biometric input captured at the user interface;
   converting, by the secure device processor, the biometric input into a binary biometric credential; and
   providing the binary biometric credential as the user credential from the secure device processor to the secure element.

5. The communication device of claim 1, wherein the baseline credential includes a fingerprint of a user, and wherein the user credential includes another fingerprint of the user.

6. The communication device of claim 1, wherein the external credential includes a digital signature.

7. The communication device of claim 1, wherein the device processor comprises a plurality of processors operating in a distributed environment.

8. The communication device of claim 1, wherein the secure element comprises a universal integrated circuit card.

9. A method comprising:
   mapping, by a secure element of a communication device, an external credential to a baseline credential in a secure element memory, the baseline credential comprising a biometric credential received from a server that is remote from the communication device;
   receiving, by a secure device processor of the communication device, an application registration request based on the application being executed by a device processor of the communication device;
   responsive to receiving the application registration request, receiving, by the secure device processor, user input including a user credential responsive to a prompt that is presented by the communication device, wherein the secure device processor is separate from the secure element and in communication with the secure element;

providing a request for an authentication from the secure device processor to the secure element, wherein the request for the authentication includes the user credential and enables the secure element to compare the user credential with the baseline credential to verify the authentication;

receiving, by the secure device processor, the authentication from the secure element without receiving the baseline credential; and facilitating, by the device processor of the communication device, wireless communications between the communication device and an external entity device that is remote from the communication device, wherein the device processor is separate from the secure device processor and in communication with the secure device processor, wherein the device processor is separate from the secure element and in communication with the secure element, wherein the device processor sends the application registration request based on the application being executed by the communication device.

10. The method of claim 9, further comprising:

receiving, by the secure device processor, the external credential from the secure element without receiving the baseline credential; and providing, by the secure device processor, the external credential to an external entity device.

11. The method of claim 9, further comprising:

enabling voice, video and data communication services at the communication device utilizing the device processor; and providing, by the secure device processor, the external credential to the application being executed by the communication device.

12. The method of claim 9, further comprising:

receiving, by the secure device processor, biometric input captured at a user interface of the communication device;

converting, by the secure device processor, the biometric input into a binary biometric credential; and providing the binary biometric credential as the user credential from the secure device processor to the secure element.

13. The method of claim 9, wherein the baseline credential includes a fingerprint of a user.

14. The method of claim 9, wherein the secure element and the secure device processor are mutually authenticated with the server using a remote management keyset.

15. A computer readable storage device comprising instructions which, responsive to being executed by a secure element of a communication device, cause the secure element to perform operations comprising:

receiving a baseline credential and an external credential, the baseline credential comprising a biometric credential received from a server that is remote from the communication device;

mapping the external credential to the baseline credential in a memory of the secure element;

receiving a request for an authentication from a secure device processor of the communication device, wherein the request for the authentication includes a user credential, and wherein the secure device processor receives the user credential in response to an application registration request based on the application being executed by the communication device;

comparing the user credential with the baseline credential to determine a match between the user credential and the baseline credential to verify the authentication; and providing the authentication and the external credential to the secure device processor without providing the baseline credential;

wherein a device processor of the communication device enables voice and data communication services to be provided at the communication device, wherein the device processor is separate from the secure device processor, wherein the secure device processor is separate from the secure element, wherein the device processor is separate from the secure element, wherein the device processor sends the application registration request to the secure device processor based on the application being executed by the communication device.

16. The computer readable storage device of claim 15, wherein the operations further comprise:

receiving a binary biometric credential as the user credential from the secure device processor, wherein the binary biometric credential is generated by the secure device processor by converting biometric input captured at a user interface of the communication device into the binary biometric credential.

17. The computer readable storage device of claim 15, wherein the device processor facilitates wireless communications between the communication device and an external entity device.

18. The computer readable storage device of claim 15, wherein the operations further comprise:

providing the external credential to an external entity device that is remote from the communication device to enable access to services provided by the external entity device.

19. The computer readable storage device of claim 15, wherein the external credential includes a digital signature.

20. The computer readable storage device of claim 15, wherein the device processor comprises a plurality of processors operating in a distributed environment.

* * * * *